(12) United States Patent
Licari et al.

(10) Patent No.: US 7,701,843 B1
(45) Date of Patent: Apr. 20, 2010

(54) INTELLIGENT-TOPOLOGY-DRIVEN ALARM PLACEMENT

(75) Inventors: Perry Vance Licari, Overland Park, KS (US); Satishkumar Sadagopan, Olathe, KS (US); John Dexter Ceniza Omolon, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1225 days.

(21) Appl. No.: 10/973,957

(22) Filed: Oct. 26, 2004

(51) Int. Cl.
*G01R 31/08* (2006.01)

(52) U.S. Cl. .................. 370/216; 370/217; 370/241; 370/242

(58) Field of Classification Search .............. 370/216, 370/217, 241, 242, 254
See application file for complete search history.

(56) References Cited

U.S. PATENT DOCUMENTS

| | | | | |
|---|---|---|---|---|
| 5,793,753 | A * | 8/1998 | Hershey et al. | 370/252 |
| 6,694,364 | B1 * | 2/2004 | Du et al. | 709/224 |
| 7,428,300 | B1 * | 9/2008 | Drew et al. | 379/29.09 |
| 2003/0110248 | A1 | 6/2003 | Ritche | |
| 2005/0048924 | A1 * | 3/2005 | Nelson et al. | 455/67.11 |
| 2005/0111352 | A1 * | 5/2005 | Ho et al. | 370/219 |
| 2005/0181835 | A1 * | 8/2005 | Lau et al. | 455/567 |
| 2006/0104208 | A1 * | 5/2006 | Walker et al. | 370/242 |
| 2007/0156656 | A1 | 7/2007 | Pather et al. | |

OTHER PUBLICATIONS

First Office Action, Mailed Oct. 31, 2007, in U.S. Appl. No. 10/973,836, filed Oct. 26, 2004.
Final Office Action, Mailed May 30, 2008, in U.S. Appl. No. 10/973,836, filed Oct. 26, 2004.
Advisory Action, Mailed Sep. 4, 2008, in U.S. Appl. No. 10/973,836, filed Oct. 26, 2004.
Non-Final Office Action, Mailed Dec. 10, 2008, in U.S. Appl. No. 10/973,836, filed Oct. 26, 2004.
First Office Action, Mailed Sep. 26, 2007, in U.S. Appl. No. 11/116,778, filed Apr. 28, 2005.
Final Office Action, Mailed Feb. 25, 2008, in U.S. Appl. No. 11/116,778, filed Apr. 28, 2005.
Non-Final Office Action, Mailed Jun. 13, 2008, in U.S. Appl. No. 11/116,778, filed Apr. 28, 2005.
Final Office Action, Mailed Dec. 12, 2008, in U.S. Appl. No. 11/116,778, filed Apr. 28, 2005.
Advisory Action, Mailed Feb. 26, 2009, in U.S. Appl. No. 11/116,778, filed Apr. 28, 2005.
Non-Final Office Action, Mailed Jan. 23, 2009, in U.S. Appl. No. 10/973,955, filed Oct. 26, 2004.
Non-Final Office Action mailed Aug. 20, 2009 in U.S. Appl. No. 10/973,955, filed Oct. 26, 2004.

\* cited by examiner

*Primary Examiner*—Kwang B Yao
*Assistant Examiner*—Nguyen Ngo

(57) ABSTRACT

System and methods are provided for automated alarm handling in a communications network by linking network failures to impacted resources. One embodiment includes correlating one or more network failures to a common network resource in a communications network, associating each network component of the communications network one to another, where the network components include one common network resource, attributing fault data originating from one or more of the network components to an associated common network resource, and collecting in a central data structure the attributed fault data with the associated common network resource.

15 Claims, 26 Drawing Sheets

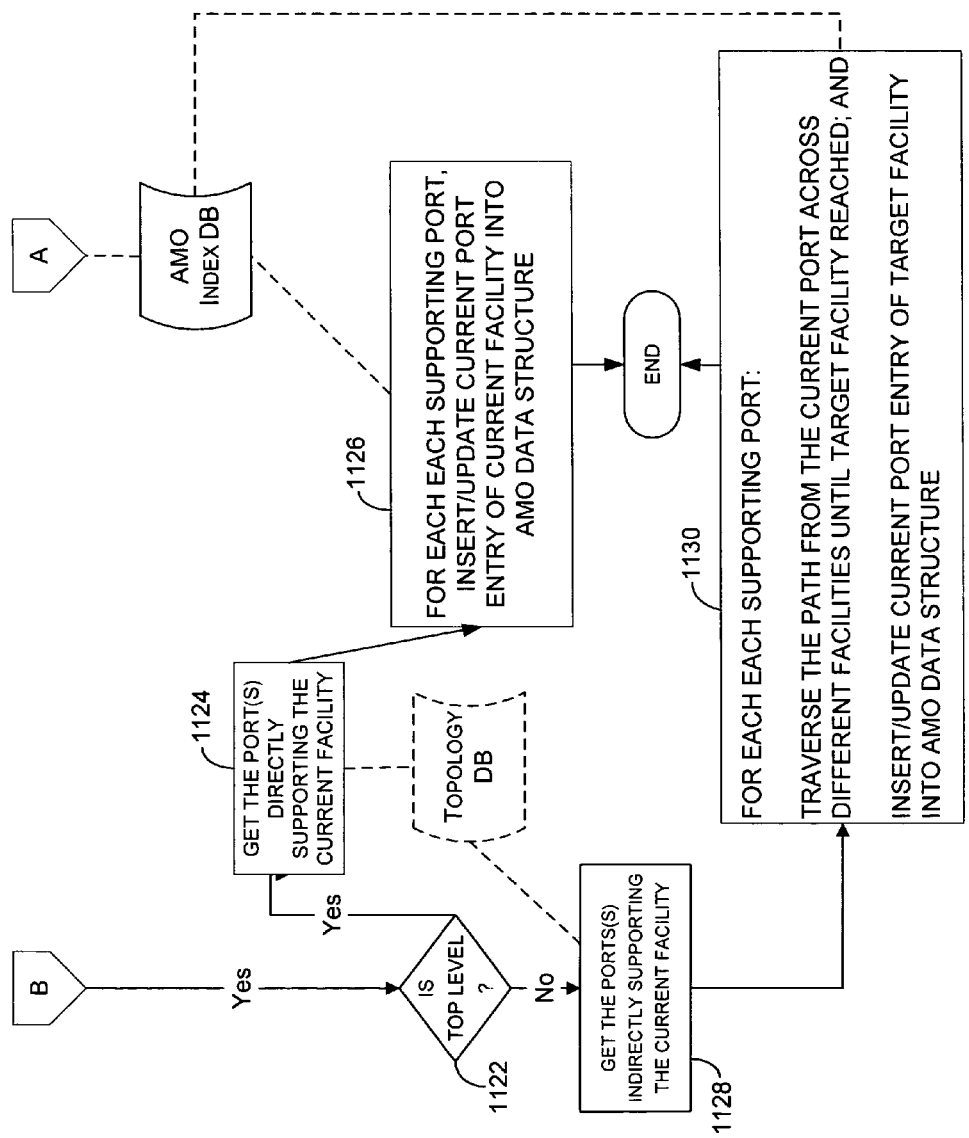
FIG. 11, CONT'D.

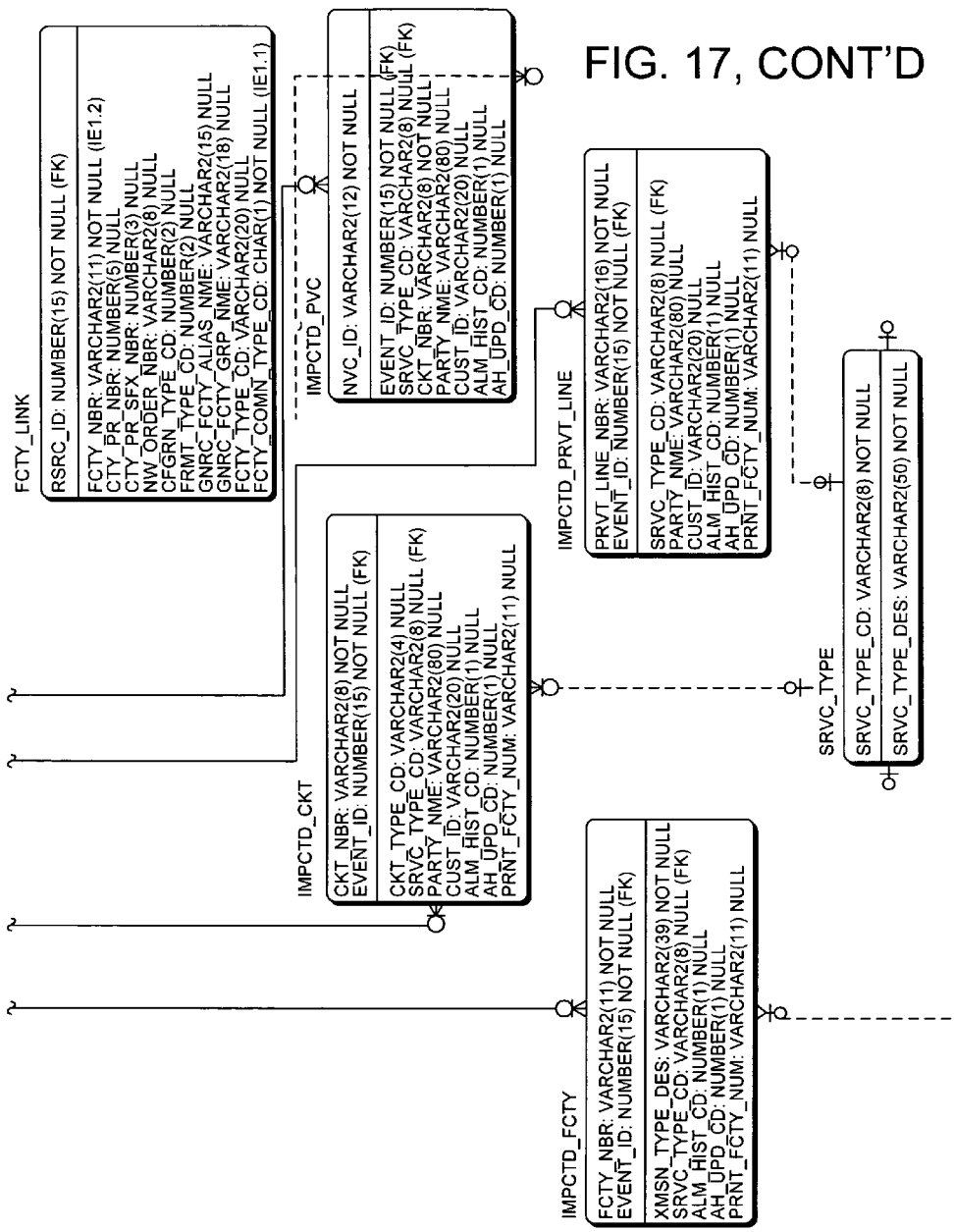
FIG. 17, CONT'D

INTELLIGENT-TOPOLOGY-DRIVEN ALARM PLACEMENT

CROSS-REFERENCE TO RELATED APPLICATIONS

Not applicable

STATEMENT REGARDING FEDERALLY SPONSORED RESEARCH OR DEVELOPMENT

Not applicable.

TECHNICAL FIELD

The present invention relates to presenting and addressing alarm information related to problems that occur in association with operating a communications network.

BACKGROUND OF THE INVENTION

The difficulty of managing a communications network is directly proportional to its complexity. As networks grow in complexity, so too does the difficulty of managing it. Managing a network includes one or more of the following: retrieving historical performance, observing that the network is currently functioning properly, and ensuring that the network will function properly in the future. To accomplish each of these functions, feedback from the network is necessary. The most widely relied upon feedback are alarms.

Alarms provide feedback that element interaction or network elements themselves are not functioning as intended. But a complex communications network may produce on the order of thousands of alarms per hour or millions of alarms per day. An alarm may be referred to in the art as a message, alert, event, warning, or other data indication. Being able to maintain awareness of the potential barrage of alarms, as well as troubleshooting the source of the alarms has historically been a resource-intensive process that plagues network administrators.

Maintaining and determining the root cause of a problem in a communications network is dependent on the knowledge and experience of technicians monitoring alarms originating from the network. The task of monitoring incoming alarms is made even more difficult if the communications network is especially large and comprises many elements that at any given time may have problems that affect network service. The topology data of a network is oftentimes incomplete and data is spread out among several data structures. Because of incomplete topology data, the task of determining the root cause of the problem is time consuming and costly, requiring the technician to know which data structure to access for which topology.

Furthermore, network communication architectures comprise many layers of facilities. Although there are many definitions of facilities, one definition may be a portion of a network that carries traffic at a continuous bandwidth. Moreover, network architectures may have built in protection schemes which, even though one or more facilities are disabled, allow continuous flow of traffic from upstream facilities to downstream facilities and, eventually, to end users. In other words, even though an upstream facility is disabled, downstream facilities may not notice the disabled upstream facility due to the protection scheme. However, network technicians, monitoring the facilities, are aware of a problem within the communications network. The technician may be receiving multiple alarms or alerts transmitted from various network elements within the facility. Possible scenarios for the disabled facility may be a faulty network element or a severed transmission pathway utilized by the disabled facility. The technician may have to physically inspect each alarming network element supporting the disabled facility to determine the root cause of the problem. Facilities may have upwards of thousands of elements spread out over vast distances. To inspect each alarming network element is time consuming and costly.

Also, each different component in a communications network has its own protection scheme in the event the component is alarming. In some cases, there is a one to one relationship between a working component and a protection component. However, in other cases, there is a one to many relationship between working components and protection components, or one protection component for several working components. Generally, technicians monitoring the communications network group alarms into service affecting alarms and service impacting alarms. Service affecting alarms may be understood as those alarms that do not impact service to the end user of the communications network, but have the potential to do so. Likewise, service impacting alarms may be understood as those alarms that impact service to the end user of the communications network. Both types of alarms require a thorough understanding of the protection scheme for each component. The protection scheme for each component should be evaluated and then a determination may be made regarding whether the alarming component is service impacting. Generally, a large long distance telecommunications network includes many components and their associated protection schemes. Evaluating whether an alarm is service impacting or service affecting may become very complicated in such networks.

As discussed above, technicians monitoring a communications network must evaluate whether an alarm is service impacting or service affecting. Service impacting alarms generally receive the highest priority. Each severe alarm from a network element creates a ticket documenting the alarm. Also, customers serviced by the communications network may call in to a service center when their service is impacted and report problems, thus creating a customer called-in ticket. Still other tickets may be generated by other entities associated with the communications network besides the monitoring technicians. All of the aforementioned tickets may be related to the same network problem. In large networks, many thousands of tickets of various types may be generated. The technicians monitoring the system may clear one type of ticket relating to a problem, but this may not affect other types of tickets relating to the same problem. Technicians must manually sift through the various tickets as they arrive and determine if the ticket relates to a previously reported ticket or relates to a new problem. Associating the various ticket types is laborious and an inefficient use of the technicians time, especially in association with large communications networks.

Still other inefficiencies plague alarm monitoring in communications networks. Generally, the technicians monitoring a communications network are grouped according to network elements. For example, a set of technicians monitor one type of network element, while other technicians monitor other types of network elements. Each technician typically receives all alarm data related to their assigned network element. There may be multiple technicians monitoring a particular type of network element, but each technician is concerned with only a subset or subsets of the incoming alarm data. Technicians must pull from a data structure the alarm data in which they are interested in viewing on their user interface.

This may be a bandwidth intensive process, especially when the communications network is large and includes many elements. The efficiency of handling alarms is decreased because of delays in communicating the alarm data to the technician. Furthermore, the process is bandwidth intensive which creates scalability problems. To accommodate additional technicians or user interfaces, additional data structures must be added to the communications network. The data structures must be fault tolerant and require maintenance and support, which runs the costs of adding additional data structures into the hundreds of thousands of dollars. In large communication networks, generating thousands of alarms, this is a cost prohibitive solution.

SUMMARY OF THE INVENTION

The present invention addresses at least a portion of the aforementioned problems. The present invention has several practical applications in the technical arts, not limited to the cost effective and timely identification and placement of alarms correctly in a network layer with many physical and logical components.

In a first aspect of the present invention, one or more media comprising computer-usable instruction to perform a method of associating one or more network failures in a communications network to at least one common network resource, the method includes creating resource management data structures having relational data on network components, where the network components may include at least one common network resource. The method further includes receiving fault data on one or more of the network components, associating the fault data with the common network resource, and collecting in a fault data structure the associated fault data with the associated common network resource.

In a second aspect of the present invention, a method is provided for correlating one or more network failures to a common network resource in a communications network. The method includes associating each network component of the communications network one to another, where the network components include one common network resource. The method further includes attributing fault data originating from one or more of the network components to an associated common network resource, and collecting in a central data structure the attributed fault data with the associated common network resource.

In a third aspect of the present invention, a method is provided for incorporating into a central data structure one or more instances of fault data pertaining to one or more network components. The method includes receiving the fault data on one or more of the network components, associating each instance of fault data with an associated common network resource, and communicating to the central data structure the associated fault data and the associated common network resource.

Additional features are described in greater detail below.

BRIEF DESCRIPTION OF THE SEVERAL VIEWS OF THE DRAWINGS

The present invention is described in detail below with reference to the attached drawing figures, which are incorporated in their entirety by reference herein and wherein.

DETAILED DESCRIPTION OF THE INVENTION

Figure 1:
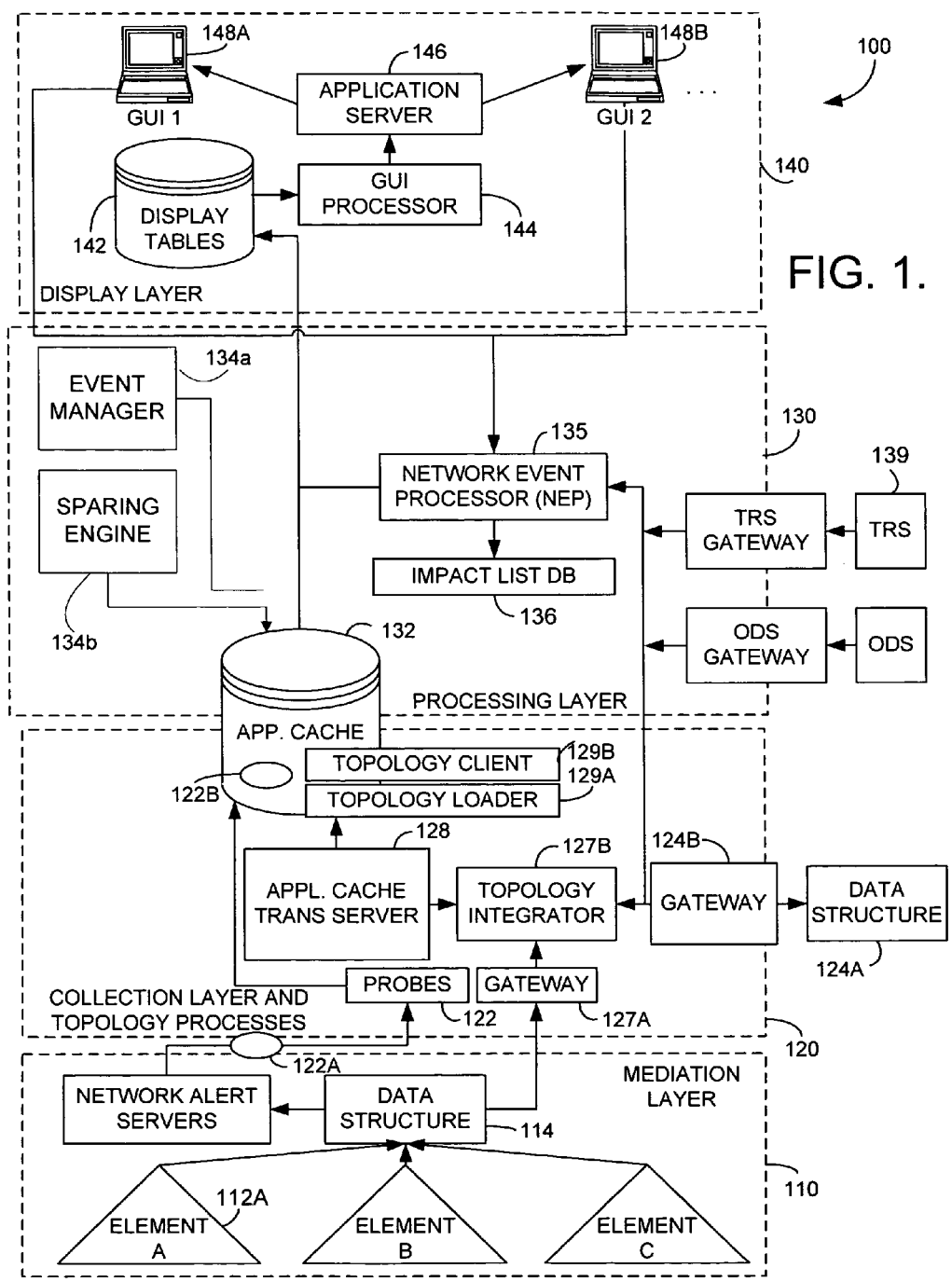
FIG. 1 is a block diagram illustrating an exemplary architecture according to an embodiment of the present invention.

The illustrative embodiments of the present invention illustrated herein provide a method and system for determining the root causes of one or more alarms in a communications network and troubleshooting problems associated with the same.

Specific hardware devices, programming languages, components, processes, and numerous details including operating environments and the like are set forth to aid in the understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, gateways, workstations, and other machines may be connected to one another across a communication medium including, for example, a network or networks.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

Further, various technical terms are used throughout this description. A definition of such terms can be found in Newton's Telecom Dictionary by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference. The term facility is loosely defined as a set of communications means providing connection between two points in a network on the same level of bandwidth.

As one skilled in the art will appreciate, the present invention may be embodied as, among other things: a method, system, or computer-program product. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media.

Computer-storage media, or machine-readable media, include media implemented in any method or technology for storing information. Examples of stored information include computer-useable instructions, data structures, program modules, and other data representations. Computer-storage media include, but are not limited to, RAM, ROM, EEPROM; flash memory or other memory technology; CD-ROM; digital versatile discs (DVD); holographic media or other optical disc storage; magnetic cassettes; magnetic tape; magnetic disk storage; and other magnetic storage devices. These memory components can store data momentarily, temporarily, or permanently.

The present invention is not limited to the following explanations.

Overview

Turning now to FIG. 1, a block diagram is provided illustrating an exemplary architecture 100 in accordance with an embodiment of the present invention. Each of the aspects depicted in FIG. 1 will be explained in significantly greater detail below. The following comments are introductory in nature and intended to help provide a high-level overview of certain aspects of the present invention. Because of the high-level of abstraction depicted in FIG. 1, it should not be construed as limiting in nature. That is, the elements, relationships, and flows of FIG. 1 are illustrative in nature and should not be construed as limitations of the present invention.

The exemplary architecture of the automated alarm processing system 100 of the present invention should have a substantially detailed topology of the monitored communications network to efficiently and accurately determine the root cause of alarms originating from various network elements.

In system 100, the topology processing occurs primarily in the collection and topology layer 120. Topology processing may utilize the following network elements: A data structure 124A, a gateway 124B, a secondary data structure 114, a secondary gateway 127A, a topology integrator 127B, an applications cache transaction server 128, a topology loader 129A, and an applications cache data structure 132. Furthermore, the aforementioned data structures may include, but are not limited to, databases, spreadsheets, and other suitable data storage devices. Also, the aforementioned gateways 124A and 127A, topology integrator 127B, applications cache transaction server 128, and topology loader 129A may include, but are not limited to, servers, processors, personal computers, laptops, workstations, and other suitable devices.

Figure 3:
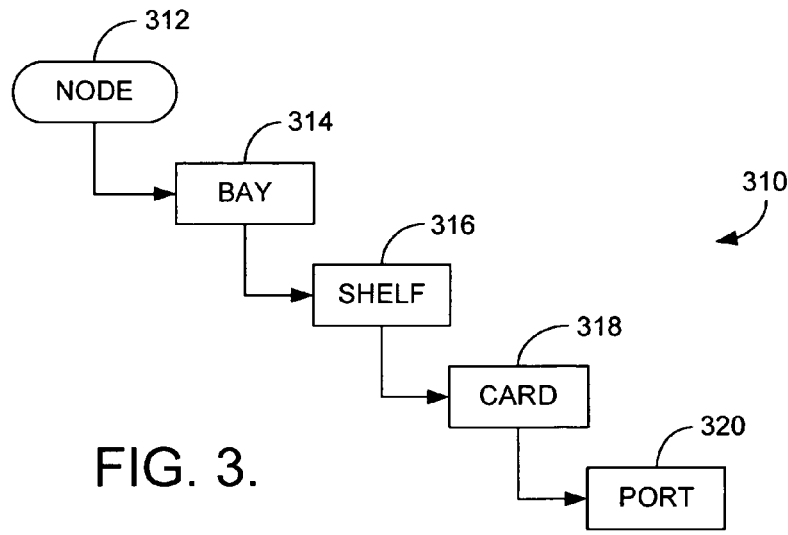
FIG. 3 is an embodiment of an illustration of the relationships among various objects in a facility which may be necessary for accurate placement of an alarm on a network element.

Topology data structure 124A includes topology data (information) for both physical and logical components of the network. Frequently, the topology data included in data structure 124A may not be structured in a manner needed for placement of an alarm in a communications network monitored by system 100. Gateway server 124B may be employed to convert data structure 124A information into an object form that may be utilized by the system 100. Further, an applications cache transaction server (ACTS) 128 may be utilized to build hierarchical relationships among the various objects from the object data communicated from gateway server 124B. With reference to FIG. 3, relationships between node objects (node 312), bay objects (bay 314), shelf objects (shelf 316), cards objects (card 318) and port objects (port 320) may be determined by ACTS 128. Furthermore, ACTS 128 may name each of the aforementioned objects before populating a staging area of applications cache 132 where topology loader 129a transfers the data created by the ACTS 128 from the staging area to a primary area of the applications cache 132.

In one embodiment, data included in data structure 124A may not provide the level of detail which may be necessary to place alarms with sufficient certainty so as to make alarm handling within the communications network easier and more efficient. Other data structures within the communications network may provide more detail. One such exemplary data structure is secondary data structure 114. Data structure 114 may be any data structure, database, or spreadsheet having additional topology data. Topology integrator (TI) 127B and secondary gateway server 127A, in combination as an integration source, may access other data structures, such as data structure 114, to enhance the information from data structure 124A data.

In order to further improve the efficiency and accuracy of determining the root cause of alarms originating from various network elements, system 100 further includes a topology client 129b to name the various facilities within a communications network and relate those facilities to various ports affecting the aforementioned facilities. Topology client 129b includes, but is not limited to, any server, processor, personal computer, laptop or other suitable device. Applications cache 132 may comprise a topology data structure, as described above, along with an AMO data structure which may include names of various alarm managed objects (generally nodes, cards, ports, timeslots) and including but not limited to alarm, sum alarm and event data structure. Exemplary data structures include a database, spreadsheet or other suitable storage device.

Continuing with system 100, probes 122 may receive alarms from various network element components, primarily ports and searches the AMO data structure for associated facilities. Once the associated facilities are found, probes 122 forward the alarm to the collection layer SQL process, which in turn populate the alarm and sum alarm data structure of the applications cache 132. The sum alarm data structure of applications cache 132 may comprise alarms from disparate network elements grouped on a common network resource, which may be a facility. An events manager (not shown) which may be a part of processing layer 130 processes the sum alarms for a common network resource and creates events which are later displayed on one or more presentation devices, discussed in further detail hereinafter.

Turning now to the process of determining which events will be displayed on the presentation device, system 100 includes a sparing engine whose function is to identify whether an alarm is service affecting or service impacting so the alarm can be handled accordingly. Generally in a communications network, each network device has its own protection scheme in the event of a failure of that device. In some cases there is a one to one relationship between a working card and a protection card, however, there is a one to many relationship or one protection card for a plurality of working cards. In other words, the sparing engine determines at what point a service affecting situation becomes a service impacting situation requiring the aforementioned event to be displayed to the user or to the technician monitoring the communications network as a service impacting event. The sparing engine uses an approach based upon an understanding of the communications network, independent of the device type or protection scheme. More specifically, if there is a failure at a certain level of the communications network, the sparing engine would determine how many child components are supported by the aforementioned level. If a certain percentage of those children have also failed, the sparing engine determines that the protection has failed and a situation should be designated as service impacting instead of service affecting.

Still referring to the function of the sparing engine in system 100, probe 122 detects an alarm from a networked element and determines whether the alarm is service affecting or non service affecting. If the alarm is service affecting, probe 122 marks the alarm as service affecting and associates the alarm to the appropriate resource. The applications cache transaction server 128 determines whether there is traffic on the facility to which the network element, from which the alarm originated, is coupled and marks the traffic bearing count of the facility accordingly. The alarm is processed by event manager 134A to create an event out of the alarm. The event may be stored in applications cache 132 where a sparing engine 134B, at predetermined intervals, queries the applications cache for service affecting events that have a traffic bearing count of greater than zero. Sparing engine 134B determines the type of facility to which the event relates, and based on the determined type of facility determines if the service affecting event should be designated as service impacting. Service impacting events are then forwarded to a technician monitoring the communications network for presentation on a presentation device.

As mentioned before, alarms received from network elements are converted into network events by event manager 134A. The sparing engine 134B marks all service impacting events for NEP 135 to process. The NEP 135 process automatically sets up a ticket in a ticketing system when an event is determined to be service impacting. Tickets are required to determine the impacted facilities and other metrics in order to clear the ticket.

NEP 135 receives and processes each service impacting event to determine the impacted resources, such as facilities, circuits, private virtual circuits and private lines. These impacted resources are stored in an impact list data structure 136. As the tickets are updated and closed, display data structures 142 are updated with appropriate event information.

A display layer 140 comprises display data structures 142, a processor 144, a server 146, and a plurality of clients 148a and 148b. Data structure 142 may include, but is not limited to, a database, a spreadsheet, and other suitable data storage devices. Furthermore, Although two clients are illustrated in the exemplary architecture 100, the number of clients may include more than two clients (thousands of clients) in other embodiments of the system 100. For example, several thousands of clients may be sourced that are located locally or all over the world.

In one embodiment, a network element 112a generates an alarm 122a, which is detected by probes 122. Alarm 122a is categorized into an event 122b in an applications cache 132. In the display layer 140, applications cache 132 populates display tables 142 with information such as the subscriptions (or associations) for clients 148a and 148b, updated event data for the event 122b, network element types included in the communications network and locations of the clients 148a and 148b. The subscriptions for clients 148a and 148b may be the updated event data for a type of network element the clients 148a and 148b wish to monitor. The display tables 142 are accessed by processor 144 and sent to server 146, which distributes update data for the event 122b to either of the clients 148a and 148b based upon their subscriptions.

The architecture 100 depicted in FIG. 1 should not be construed as a limitation of the present invention. Boundaries that form the various layers are gray and broad, not black and narrow. They are provided to explain the present invention. The four layers depicted in FIG. 1 help conceptualize various functional aspects offered by the present invention.

Topology Processing

Figure 2:
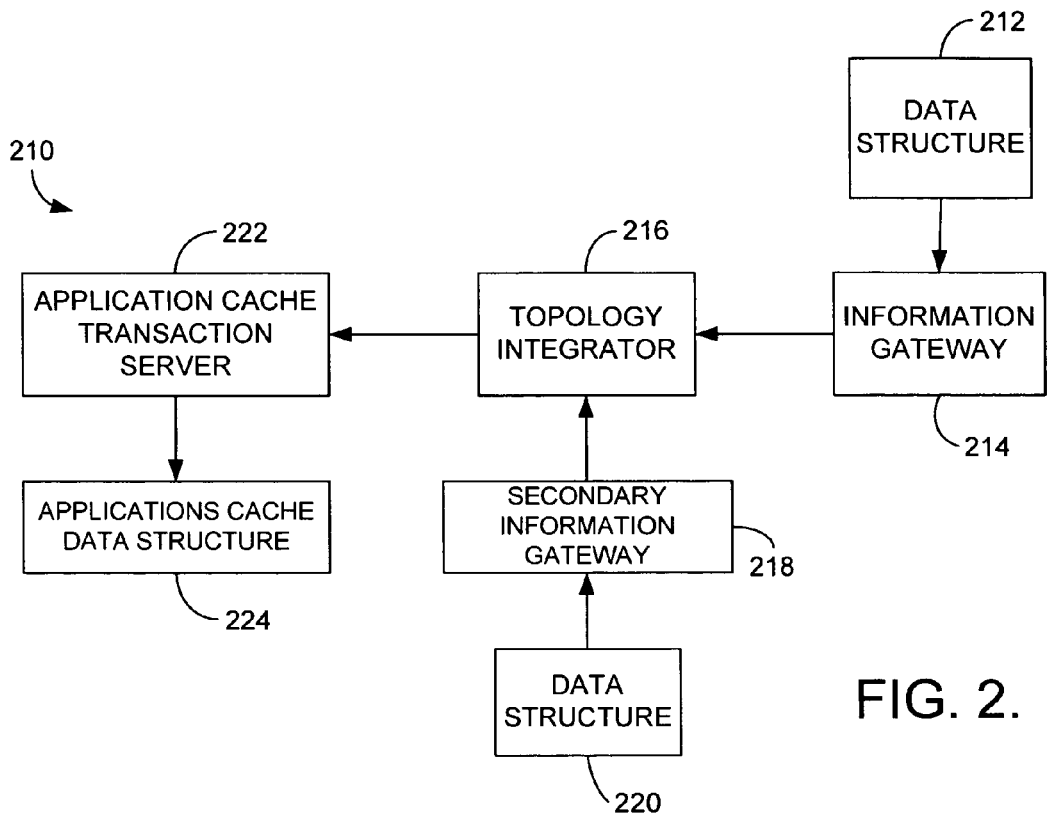
FIG. 2 is a system diagram illustrating basic components of an embodiment of a system for populating a topology data structure.

Turning now to FIG. 2, illustrative components of an exemplary system 210 for populating a topology data structure are provided. Exemplary data structures include, but are not limited to, databases, spreadsheets, and other suitable storage devices. System 210 comprises a topology data structure 212, which includes topology data related to the communications network, and an information gateway 214, which converts the topology data in data structure 212 into an object form. An application cache transactions server (ACTS) 222 builds the relationships among the various objects received from gateway 214 and names those objects. ACTS 222 loads the received topology data into an applications cache data structure 224. However, as previously discussed, the topology data received from the data structure 212 may sometimes be incomplete. For example, the topology data included in data structure 212 may not necessarily include topological information related to SONET (Synchronous Optical NETwork) regenerators and common cards that do not support facilities. These aforementioned elements may be included in a secondary data structure 220. Data structure 220 may be any additional data structure having additional topology data. A topology integrator (TI) 216 and secondary information gateway 218 are added to form a complete topology of the communications network. To form the complete topology, TI 216 first determines if the data received from the data structure 212 is incomplete and then executes a call to secondary information gateway 218 to obtain additional topology data from secondary data structure 220. After supplementing the topology data from data structure 212 with the additional topology data from secondary data structure 220, TI 216 transfers the complete topology data to the ACTS 222. ACTS 222 then transfers the complete topology data along with the relations among the various objects in the topology data and related object names to the applications cache data structure 224. In addition, the system 210 may include multiple instances of each of the aforementioned components. For example, the system 210 may include one or more TI 216, secondary information gateway 218, secondary data structure 220, data structure 212, and ACTS 222 feeding topology data to the applications cache data structure 224. Further, any combination of the aforementioned elements are possible. For example, there may be one secondary information gateway 218 accessing one or more secondary data structures 220, or there may be one secondary information gateway 218 for each secondary data structure 220. In this way, the system 210 may process multiple threads of topological data.

Referring now to FIG. 3, there is illustrated the relationships among various objects in a facility 310 determined by ACTS 222 of FIG. 2. ACTS 222 builds the relationships among objects and gives each object monitored by system 100 of FIG. 1 an alarm managed object (AMO) name. AMO refers to a network component monitored by the automated alarm handling system 110 of FIG. 1. The topology data transferred by the TI 216 and the relationships among the various objects in the topology data as determined by ACTS 222 are transferred to the application cache data structure 224 in a contains (parent-child) or supports (example: ports support facilities) relationship. For example, in FIG. 3, a node 312 contains a bay 314, which contains a shelf 316, which contains a card 318, which contains a port 320. The bay 314, shelf 316, card 318, and port 320 all are children of node 312 and have a "node is" relationship with the node. A new shelf may be added to the bay 314 without the addition of a new bay. All of the aforementioned data is stored in the applications cache data structure 224 of FIG. 2 along with the AMO data and address identification data (AID data) for node 312, bay 314, shelf 316, card 318, and port 320. This data allows for the location of alarm generating network elements with substantial accuracy. In flowcharts of FIGS. 4-5D, an exemplary process of enhancing data included in topological data structure 212 is further explained.

Figure 4:
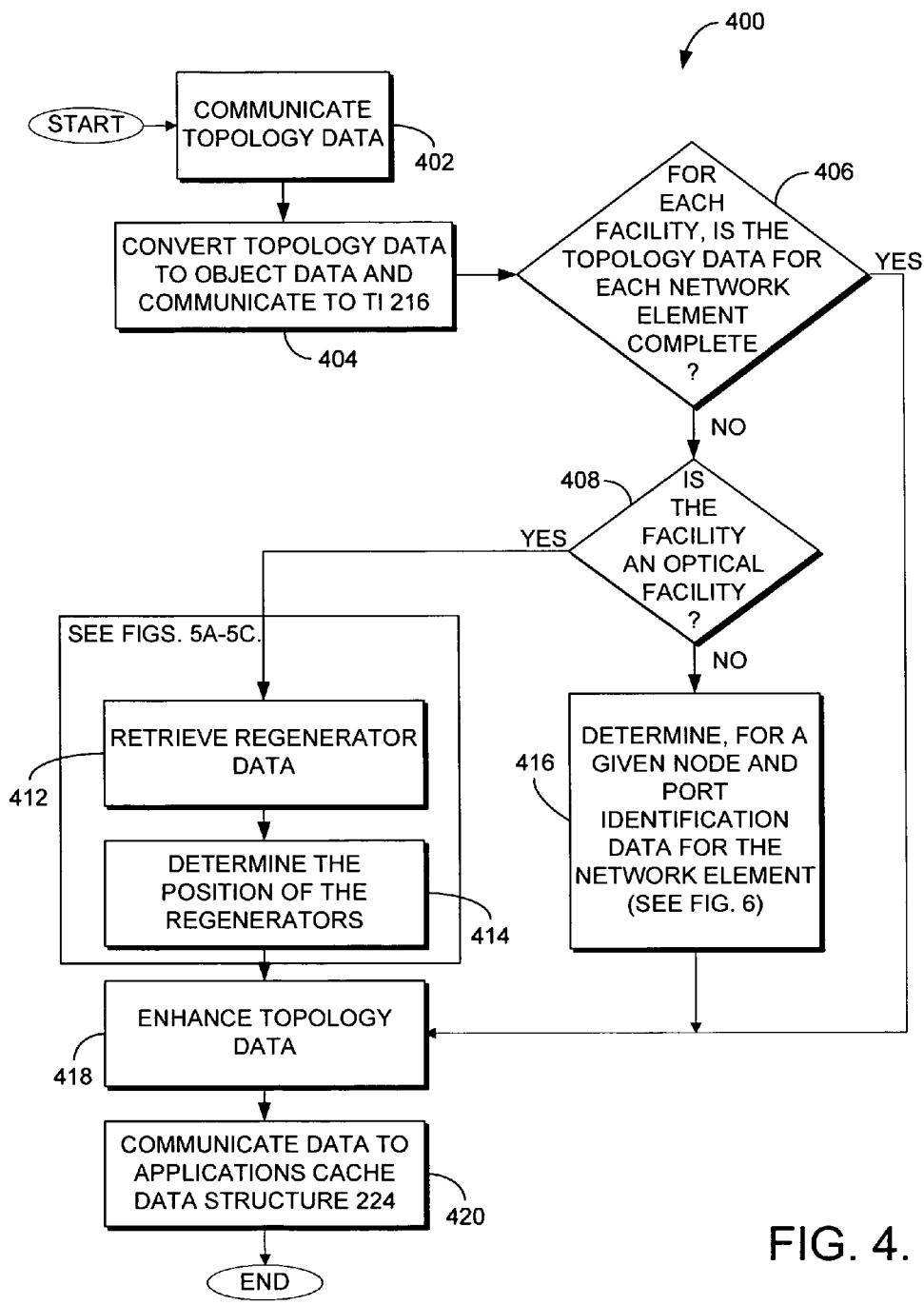
FIG. 4 is a flow chart of an embodiment of a general process for enhancing topology data.

Turning now to FIG. 4, there is shown a flow chart of one embodiment of a process 400 for supplementing topology data according to the present invention. Topology data structure 212 communicates topology data to information gateway 214 at a step 402. At a step 404, information gateway 214 converts topology data structure 212 data into objects that can be utilized in the automatic alarm handling schema of the present invention. Information gateway 214 then communicates the converted topology data structure 212 data to TI 216. At a step 406, TI 216 determines if the data is complete for each facility included in topology data structure 212 data. If the data is complete, topology data structure 212 data is forwarded to ACTS 222, which transfers topology data structure 212 data to applications cache data structure 224 at a step 420. TI 216 determines if the facility is a SONET facility (a facility including optical components) at a step 408. TI 216 is preprogrammed to know that SONET facilities may have regenerators located between ADMs (add-drop multiplexors). Topology data structure 212 does not provision regenerators. TI 216 is also preprogrammed to recognize that topology data structure 212 does not provision complete topological data on other types of network elements, such as a narrow band digital cross-connect switches (NBDCS). If the facility is not a SONET facility, and topology data structure 212 data is incomplete, TI 216 may invoke secondary information gateway 218 to query the secondary data structure 220 for additional topology data to enhance topology data structure 212 data at a step 416. For example, topology data structure 212 data may include a new facility comprising data for a node and a port. AID data for a network element AMO is known, but does not include AID data relating to the bay, shelf, card and slot information for the network element AMO, which is useful in determining the root cause of the alarms generated by the network element. If a card is malfunctioning, it will generate alarm data to report the problem. However, because topology data structure 212 data is incomplete, it is not possible to place the alarm on the card and is therefore difficult to determine that the card is malfunctioning, and not the port coupled the AMO. To complete the topology, TI 216 communicates the node and port information for the particular AMO to the secondary information gateway 218 at step 416. The secondary information gateway 218 then queries secondary data structure 220 for the additional topology data. For a given node and port AID, the secondary information gateway 218 returns the bay, complex, shelf, and card data for the particular network element model.

If, at step 408, TI 216 determines that the facility is a SONET facility, the secondary information gateway 218, at a step 412, queries the secondary data structure 220 for regenerator information included in the SONET facility. At a step 414, TI 216 places the regenerators returned by the secondary information gateway 218 in the appropriate location within the SONET facility. At a step 418, data included in topology data structure 212 may be supplemented with the regenerator data derived by TI 216 from the data returned by the secondary information gateway 218. At a step 420, TI 216 communicates the enhanced topology data structure 212 data to the applications cache data structure 224, and the process 400 for supplementing topology data in the applications cache data structure 224 is complete. The above process 400 may be implemented in an on demand mode (new facility added to the network topology) or bulk mode (the complete network topology is uploaded to the applications cache 224).

Figure 5A:
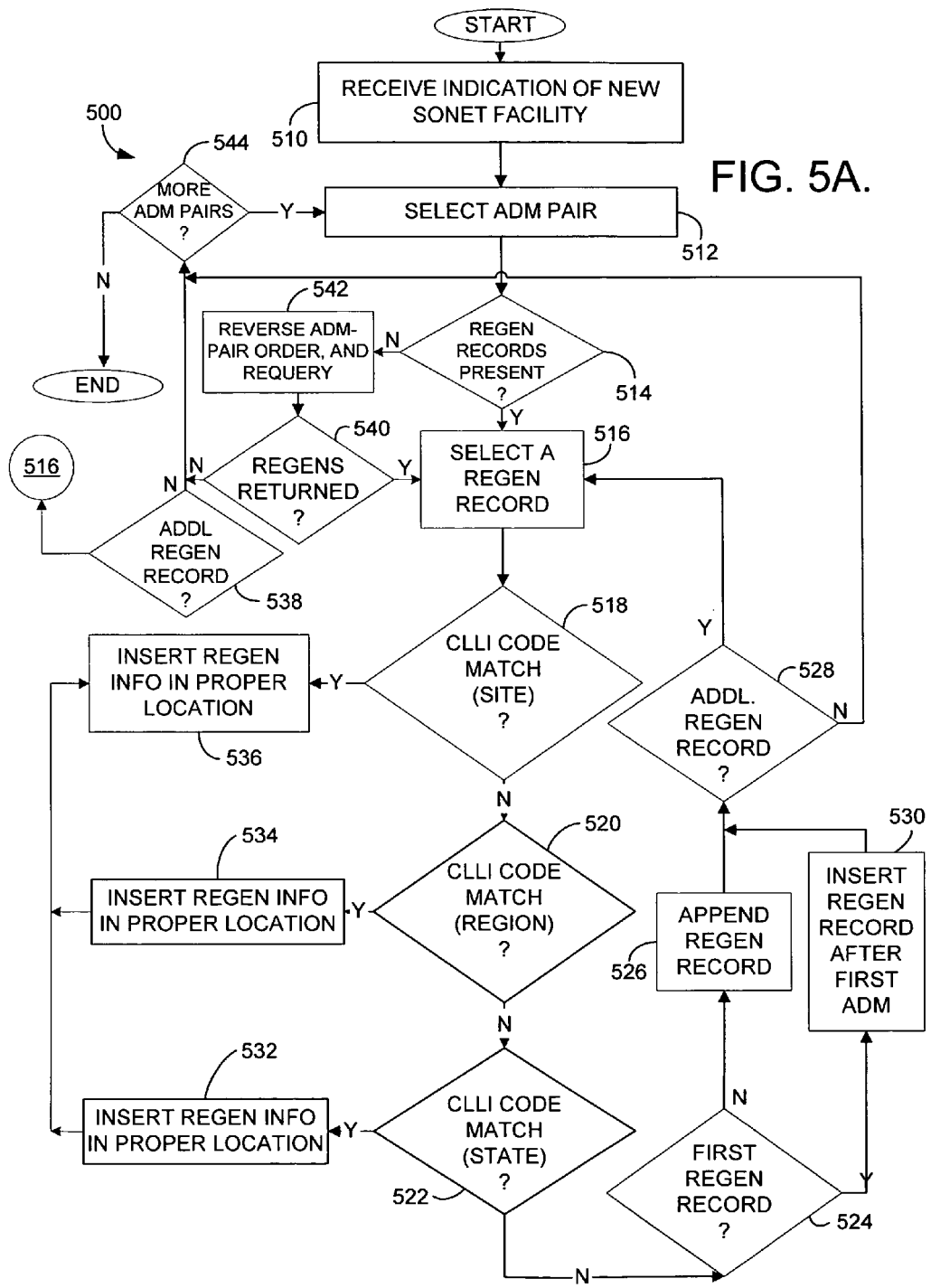
FIGS. 5A through 5C illustrate one embodiment of FIG. 4, which is the enhancement of topology data relating to an optical facility.

FIGS. 5A through 5D illustrate another embodiment of the invention, which is the enhancement of topology data structure 212 data having a SONET or optical facility with data relating to any regenerators within the SONET facility. Referring now to FIG. 5A, there is shown in a flow chart of one embodiment of a process 500 for receiving enhancements to topology data structure 212 data in the applications cache data structure 224 of FIG. 2, according to the present invention. In this particular illustration, TI 216, along with secondary information gateway 218 determines the locations of regenerators between ADM pairs located within the SONET facility. Process 500 begins at a step 510, where the TI 216 receives a notification from information gateway 214 of a change in the topology of the communications network. In this particular illustration, a new SONET facility node including at least two ADMs may be added to the network. As previously mentioned, to process alarms from elements in the communications network, the applications cache data structure 224 should be updated with sufficient information (topology data) to substantially accurately locate the element that is in an alarm state. At a step 512, TI 216 is preprogrammed to recognize that topology data structure 212 data does not include data relating to the location of regenerators (if any) between ADM pairs. TI 216 retrieves one ADM pair from topology data structure 212 data and queries secondary information gateway 218 to retrieve any regenerator records between the ADM pair. At a step 514, if secondary information gateway 218 does not return regenerator records between the ADM pair, the ADM pair data retrieved from topology data structure 212 data is reversed at a step 542 and secondary information gateway 218 again queries secondary data structure 220. This is necessary because topology data structure 212 data may record the ADM pair in one order, but the secondary data structure 220 may record the ADM pair in the reverse order. For example, if the ADM pair is recorded in topology data structure 212 as 1-2 and the ADM pair is recorded in the secondary data structure 220 as 2-1, then the secondary information gateway 218 may not find the 1-2 ordered ADM pair. If, at step 514 or 540, secondary information gateway 218 returns regenerator records, TI 216 selects the first regenerator in the sequence of regenerators returned from the secondary information gateway 218. If no regenerator records are returned, TI 216, at a step 544 determines if another pair of ADM records are included in topology data structure 212 data. If another pair of ADM records exist, then step 512 is repeated. If no other ADM records exist, the process is ended. The topology data is complete and TI 216 forwards topology data structure 212 data to ACTS 222 for loading into the applications cache data structure 224.

Continuing at step 516, TI 216 selects the first regenerator in the sequence of regenerators returned from the secondary information gateway 218. The query described in step 512 by the secondary information gateway 218 is discussed in further detail in relation to FIG. 5B, and includes converting the CLLI code of the regenerators into standard CLLI code, because regenerators oftentimes may have non standard CLLI codes assigned to them. At a step 518, the TI 216 checks for four equipment records in between the ADM pair having the same site CLLI code (the first eight bytes of CLLI code) in topology data structure 212 data. If four equipment records are found (input and output ports of network elements between the ADM pair), at a step 536 the regenerator data retrieved from the secondary data structure 220 is inserted after the first two site equipment records in topology data structure 212. At a step 538, TI 216 determines if another regenerator record was returned by secondary information gateway 218. If another regenerator was returned, process 500 continues at a step 518. If another regenerator record was not returned, TI 216 searches topology data structure 212 data for another ADM pair and process 500 is repeated from step 512.

Continuing with step 520, if four equipment records are not found, process 500 continues at steps 520 and 522 and determines if four equipment records are found in topology data structure 212 with the same city/state CLLI code and with the same state CLLI code. Whichever match is found, the regenerator data retrieved from secondary data structure 220 is inserted after the first two equipment records. If no matches are found in topology data structure 212, at a step 524, TI 216 determines if the regenerator data retrieved from the secondary data structure 220 is the first regenerator returned. If the regenerator data is the first regenerator data returned by the secondary information gateway 218, at a step 530 the regenerator data is inserted immediately after the first ADM in the ADM pair, and, at a step 528, TI 216 checks if another regenerator record was returned from secondary information gateway 218. If another regenerator was returned, process 500 is repeated at step 518. However, if the regenerator data is not the first regenerator data returned by the secondary information gateway 218, at a step 526 the regenerator data is inserted after the previous regenerator, and process 500 continues at step 528.

Figure 5B:
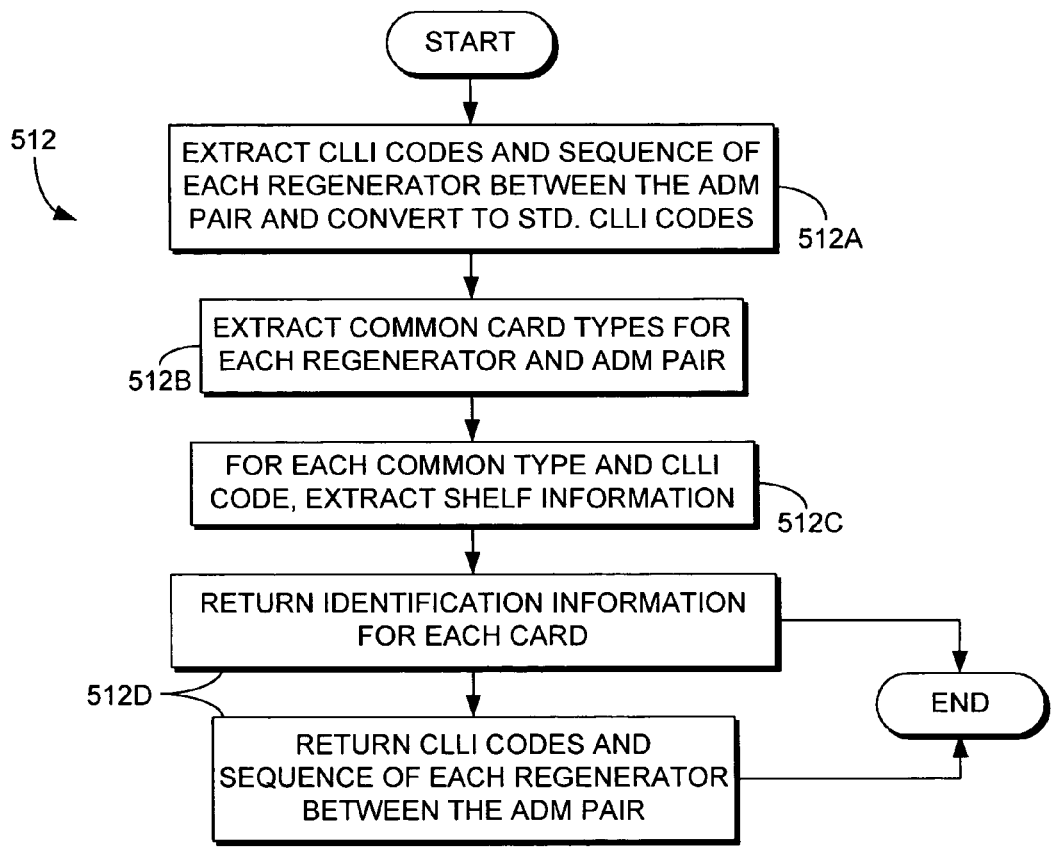

Referring now to FIG. 5B, there is shown a flow chart of one embodiment of step 512 illustrating the function of secondary information gateway 218 in process 500 of FIG. 5B. Step 512 begins with extracting the CLLI codes and sequence number of each regenerator between the ADM pair selected in step 512 by TI 216. At a step 512A, if there are regenerators between the pair of ADMs found in the secondary data structure 220, the secondary information gateway 218 extracts the CLLI code for each regenerator and the sequence of the regenerators between the ADM pair. Also, at step 512A, the secondary information gateway 218 converts the nonstandard CLLI code of the regenerator (CLLI codes for regenerators are assigned internally by field technicians and do not follow the Bellcore standard) to standard CLLI code, which may be used by the TI 216 in steps 518 to 522 of FIG. 5A to place the regenerators in the proper location between the ADM pair. Based on the model of the regenerator, at a step 512B the secondary information gateway 218 determines the card type and AID of the card which supports the specific model of the regenerator between the ADM pair. At a step 512C, based on the CLLI code of the ADM pair and card type AID data, the secondary information gateway 218 determines the appropriate bay, shelf, and slot AID data within which the card type for the model of the regenerator is located. This data is used to enhance topology data structure 212 before the enhanced topology data structure 212 data is communicated to the ACTS 222 at step 418 of FIG. 4.

Figure 5C:
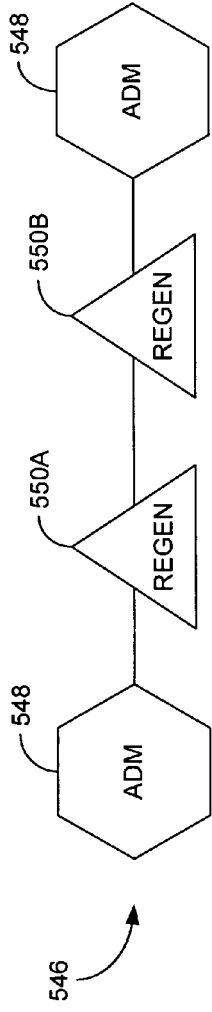
Figure 5C:
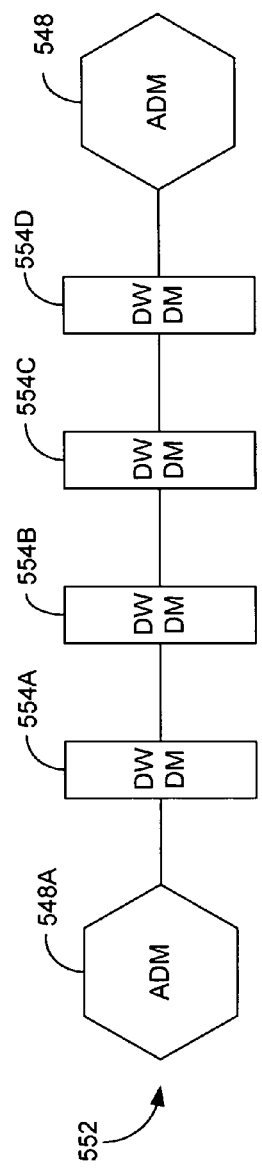
Figure 5C:
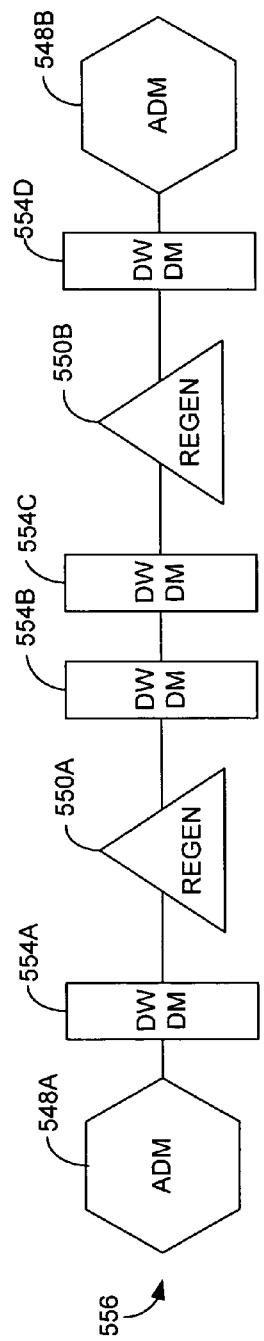

Referring now to FIG. 5C, in combination with FIGS. 4-5B, there is graphically illustrated data 546 included in the secondary data structure 220 and data 552 which is included in topology data structure 212. Data 552 in topology data structure 212 may comprise ADM 548A, ADM 548B, DWDM (dense wavelength division multiplexors) 554A, DWDM 554B, DWDM 554C, and DWDM 554D. DWDMs 548 A-D are network elements provisioned in topology data structure 552 data, but may have regenerators included in secondary data structure 220 between them. A complete topology data 556 may comprise a combination of secondary data structure 220 data 546 and topology data structure 212 data 552, which is accomplished by the TI 216. In this particular illustration, the regenerator 550A is inserted between DWDMs 554A and 554B and the regenerator 550B placed between DWDMs 554C and 554D. Referring to steps 518 through 522 of FIG. 5A, the TI 216, using the data (CLLI code and sequence of the regenerators 550 A-B) retrieved by secondary information gateway 218 by step 512 illustrated in FIG. 5B, places the regenerators 550 A-B in their respective positions between the ADM pair (ADMs 548A-548B). Specifically, TI 216 attempts to match the CLLI code of the regenerators 550A and B, each of which may have an input and an output port, to the CLLI code of the DWDMs 554A through D, each of which may have an input and an output port. Based on the CLLI code data and sequence data, TI 216 may substantially accurately place the regenerators 550A and B in their proper locations.

As mentioned with reference to FIG. 4, at step 416, the TI 216 is also preprogrammed to recognize that topology data structure 212 data for a given facility, even a facility is not a SONET facility, may not provision sufficient data for other network elements, such as a NBDCS, to be utilized in the alarm handling schema of the present invention. In another embodiment, TI 216 enhances topology data structure 212 data for the given facility having node and port data for the Network Element (NBDCS), with complex, shelf, and card data for the Network Element. In this embodiment, secondary information gateway 218 performs the majority of the process for enhancing topology data structure 212 topology data, as discussed next in relation to FIG. 6.

Figure 6:
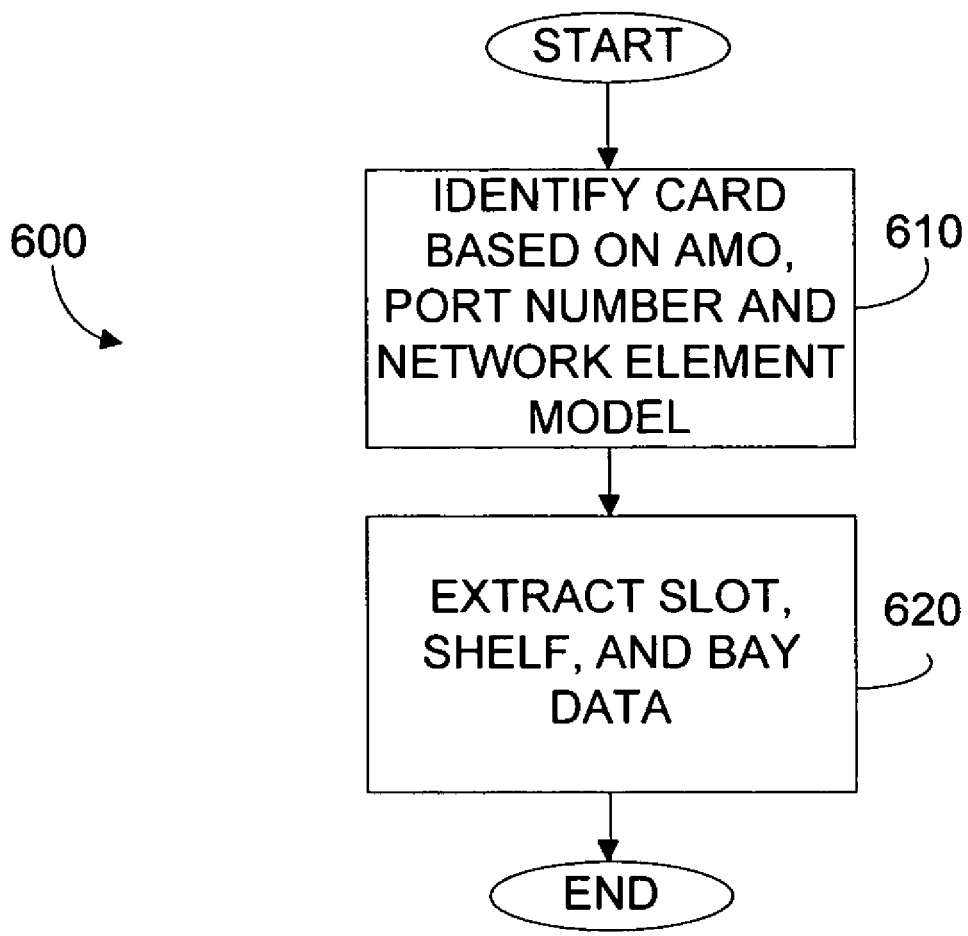
FIG. 6 is a flow chart illustrating another embodiment of FIG. 4, which is the enhancement of topology data relating to a facility having incomplete data on a network element.

Referring now to FIG. 6, a process 600 begins with the secondary information gateway 218 determining at a step 610, based on the AMO and number of the port and the type of NBDCS network element data, the card that is contained by the specific model of the NBDCS. In other words, secondary information gateway 218 retrieves the card type and the parent of the port AMO associated with the network element model. Based on this information, at a step 620, secondary information gateway 218 extracts AID, AMO and number data for slot, shelf, and bay (or complex) to complete the topology data in topology data structure 212 data.

The system and processes illustrated in FIGS. 2-6 provide the automated alarm handling system 100 of FIG. 1 an advantage of substantially accurately placing alarms on the appropriate network elements with a degree of certainty not found in the prior art. Also, while processes illustrated in FIGS. 5A-5C relate to an optical facility, other embodiments may incorporate process 600 of FIG. 6 with the processes of FIGS. 5A-5C.

Intelligent Topology Driven Alarm Placement

Figure 7:
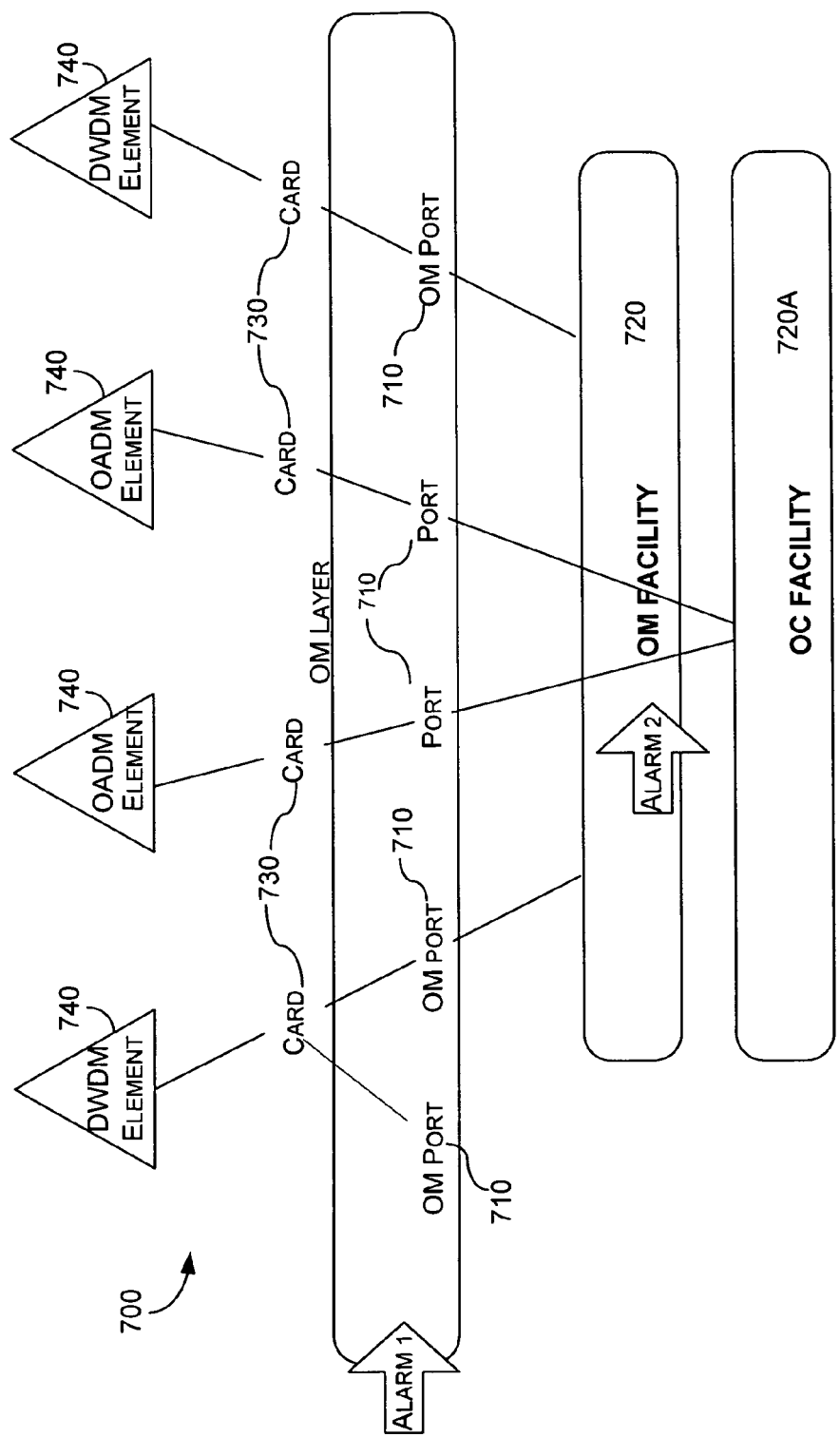
FIG. 7 illustrates one embodiment of alarm placement in the present invention.

Referring to FIG. 7, there is shown an exemplary embodiment of the present invention. A system 700 illustrates the functionality of intelligent topology driven alarm placement in the automated alarm handling schema. Alarm placement is primarily concerned with two aspects of a communications network. First, a monitoring point or the network element that reports a problem. Second, a placement resource where the problem is placed. Ports are the communication points between physical layers of the network (network elements) and logical layers of the network (facilities). Generally, a port 710 in the physical layer may be the monitoring point for problems with network elements 740 that are then placed on a facility 720 in the logical layer, which may be the placement resource. Although FIG. 7 refers to a port as a monitoring point, the monitoring point may be any piece of equipment including a card, shelf, bay or node. Similarly, the placement resource may be any piece of equipment, and should not be construed as limited to a facility. The port, as illustrated in FIG. 3, may be coupled to a card, which resides on a shelf in a bay coupled to a node. A card may have multiple ports, a shelf may have multiple cards, and a bay may have multiple shelves. Further, a network element, such as elements 740, may be any type of network element found in a communications network, such as DWDMs (dense wavelength division multiplexors) and ADMs (add-drop multiplexors).

In FIG. 7, an alarm 750 originating on port 710 represents the monitoring point. Alarm 750 from port 710 is placed on facility 720, which represents the placement resource. A data structure (discussed later) may be created that identifies and maintains a reference to both the monitoring point and the placement resource for all alarms. The port alarms on various devices supporting the same facility will be correlated to become part of the same network event for that facility.

Figure 8:
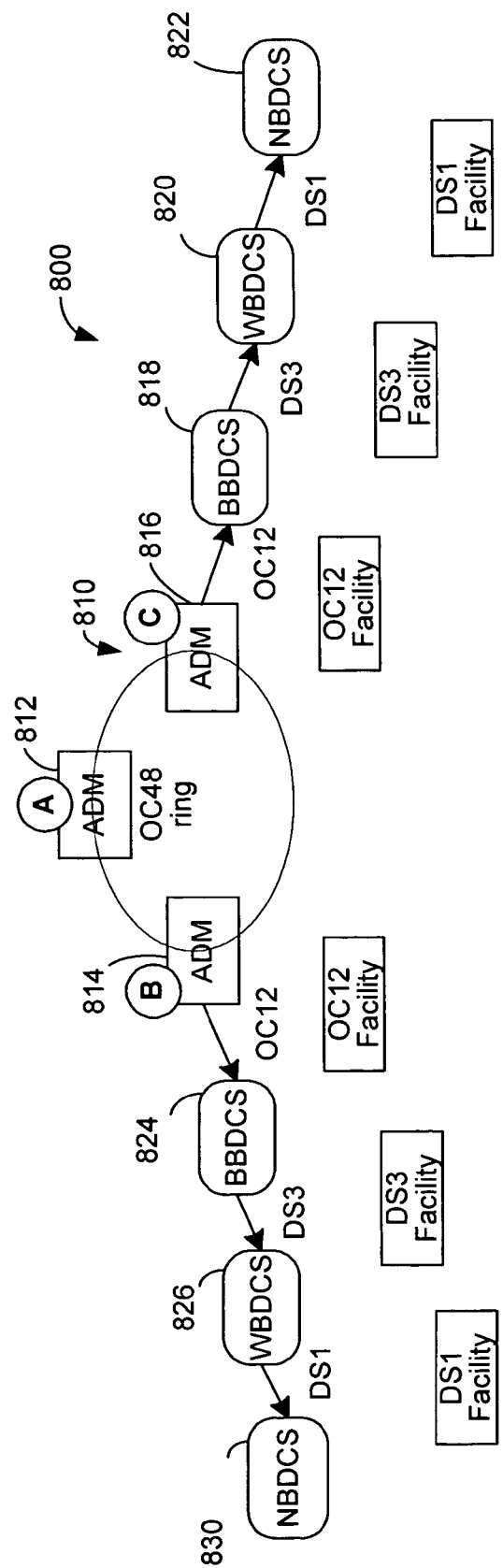
FIG. 8 illustrates one embodiment of a communications network used in conjunction with the present invention to further illustrate alarm placement.

Referring now to FIG. 8, there is illustrated one embodiment of a system for the 800 used in conjunction with the present invention. Communications network 800 may include an OC-48 SONET ring 810 facility. A facility may have many meanings, one of which may include a segment, portion or link of a network which has a continuous bandwidth that may include zero or more ports. Thus, ring 810 would be comprised of OC-48 facilities. The term OC-48 may refer to an optical carrier capable of carrying 48 light signals. Likewise, OC-12 may refer to an optical carrier capable of carrying twelve light signals, and a segment, portion or link of a network having a continuous OC-12 carrier could be an OC-12 facility. Further, a designation of DS-3 may refer to an electrical carrier capable of carrying electronic signals, and a segment, portion or link of a network having a continuous DS-3 carrier could be a DS-3 facility.

Ring 810 may further couple, for example, ADMs 812, 814, and 816 one to the other. ADMs may be network elements analogous to entrance and exit ramps onto a highway. ADMs remove and place network communication signals into ring 810. Other embodiments may include still other network elements, such as DWDMs, repeaters, regenerators, amplifiers, and other network elements found in a communications network in ring 810, and the topology of network 800 illustrated in FIG. 8 should not be construed as limiting the scope of the present invention. In other embodiments, network 800 may have a star, bus or other network topology and may be any type of communications medium (either electrical or optical) capable of carrying communication signals.

Referring still to FIG. 8, ADMs 814 and 816 may further be coupled with broadband digital cross connect switches (BBDCS) 818 and 824, wideband digital cross connect switches (WBDCS) 820 and 826, and narrowband digital cross connect switches (NBDCS) 822 and 830 to ring 810 through facilities. Other embodiments may include repeaters, regenerators, amplifiers and other network elements between each BBDCS 818 and 824, WBDCS 820 and 826, and NBDCS 822 and 830. Still other embodiments may couple each of the aforementioned network elements to still other ADMs and network topologies.

Communication signals (either data or voice signals), may be added and dropped from ring 810 by ADMs 812, 814, and 816 onto, for example, an OC-12 facility between ADM 814 and BBDCS 824. A SONET ring, such as ring 810, generally has a redundancy built into the ring to protect service to users (or customers) of ring 810 if a network failure occurs in a portion of ring 810. For example, assume ring 810 experiences a fiber cut in a portion of the ring 810 between ADM 814 and ADM 816. Communications network 800 would perform a ring or span switch and reroute signals propagating from ADM 814 to ADM 816 through ADM 812 to protect service. The downstream elements of ADMs 814 and 816 should not notice a network failure because they should still receive signals. However, network elements, such as DWDMs between ADMs 814 and 816 may experience loss of signal and begin to emit alarms on their associated ports. Assume these associated ports are monitoring points on the network. The technician monitoring these ports may know that service to customers has not been interrupted, but may not know the root cause of the alarms. Referring to the functionality discussed in relation to FIG. 7, network 800 accesses a data structure, and, given the monitoring point information, places events (or grouping of alarms) on the OC-48 facility, the placement resource, between ADM 814 and ADM 816. This enables the technician to quickly and efficiently locate the root cause of the alarms.

In order to successfully correlate the originating point of an alarm in the physical network (monitoring point) to an impacted resource (placement resource), substantially all of the network components should be named. For example, in one embodiment, the name of the port emitting the alarm from the DWDM between ADMs 814 and 816 may be extended to the facility the network element (the DWDM) supports. The naming information may be stored in a data structure which may include a port's alarm managed object data (AMO), which is a system name for the port. The data structure may also include an address of a network component emitting the alarm (a resource ID) and the address of a network component that the port supports (an assignment resource ID), which may be a facility.

Figure 9:
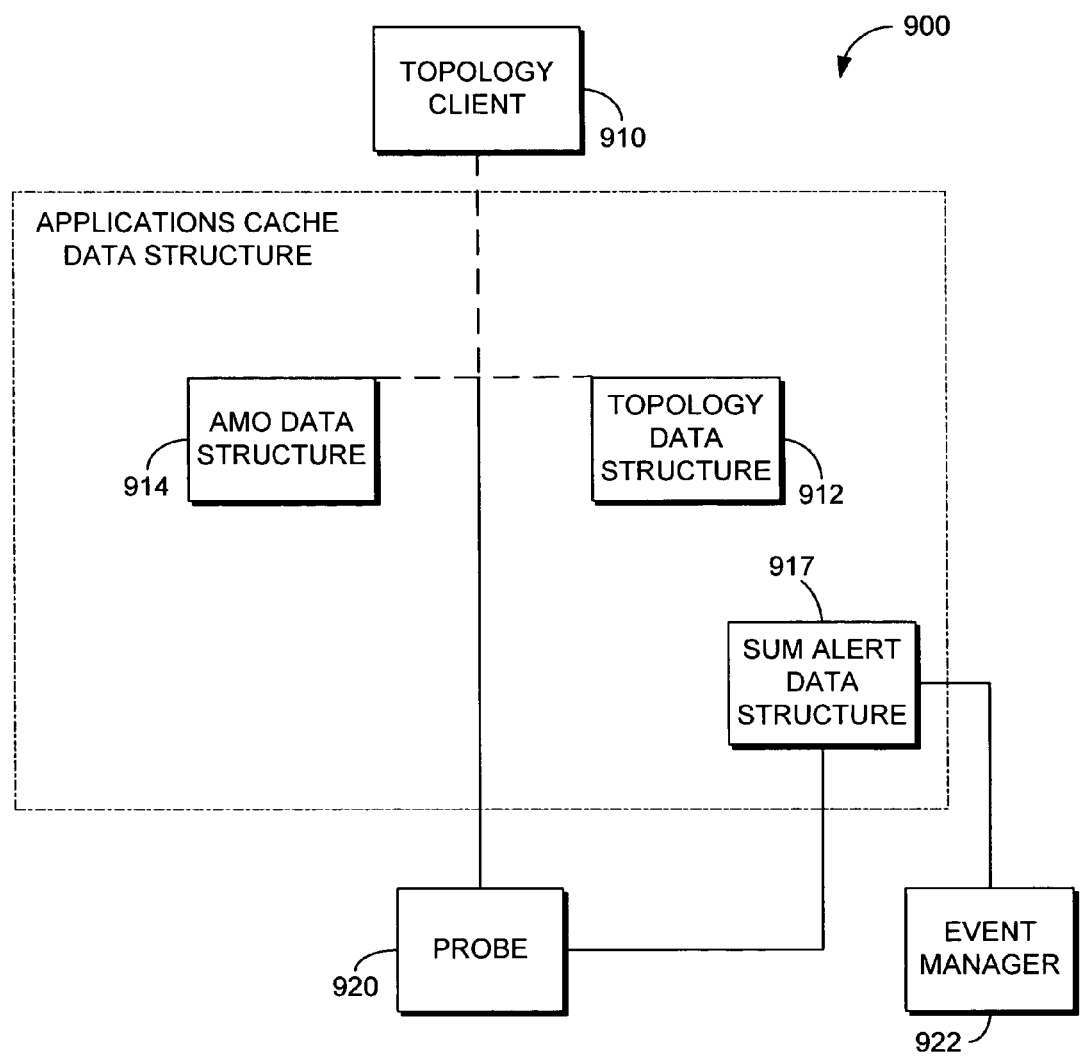
FIG. 9 is a block diagram of one embodiment of the present invention pertaining to alarm placement illustrated in FIGS. 7-8.

Turning now to FIG. 9, there is illustrated a block diagram of one embodiment of the present invention. An intelligent topology drive alarm system 900 includes a topology client 910, a probe 920 and an event manager 922. Although one topology client 910, probe 920, and event manager 922 are shown in system 900 for purposes of illustration, multiple instances of system 900 and associated components may be found throughout a large communications network. Topology client 910, probe 920, and event manager 922 of system 900 may be servers, processors, personal computers, laptop computers, workstations or other suitable device. Also included in system 900 is an AMO data structure 914, a topology data structure 912, and a sum alert data structure 917. The aforementioned data structure may be included in the applications cache data structure 132 of FIG. 1 for purposes of this illustration. The data structures may be any type of data structure such as a database, file, spreadsheet or other suitable data structure. Furthermore, data structures 912, 914 and 917 may be grouped into a single data structure or spread out among several data structures. Moreover, data structures 912, 914, and 917 do not necessarily have to be housed in the data structure 132, but may be found throughout the communications network.

In order to place an event (which is a collection of alarms from one or more probes 920 affecting the same facility) created by event manager 922, system 900 may name substantially all the various elements in a communications network. Substantially all ports, cards, shelves, bays, nodes and facilities will be given a name to represent themselves as alarm managed objects (AMO)s. Names for the physical elements up through the port level are given by the applications cache transaction server or ACTS 128 of FIG. 1. Names for facilities are given by topology client 910. Topology client 910 uses the relationships between the various elements of the communications network to derive the AMO names for the facilities. As will be shown in greater detail in relation to FIG. 11, topology client 910 associates facilities with ports. Topology client 910 retrieves the name of the port in the AMO data structure 914 and assigns the name of the port to a an associated facility. If a facility is channelized, topology client 910 derives the name of the child facilities based on the name of the port and timeslot numbers of the facility. Named facilities are then stored in the AMO data structure 914.

Figure 10:
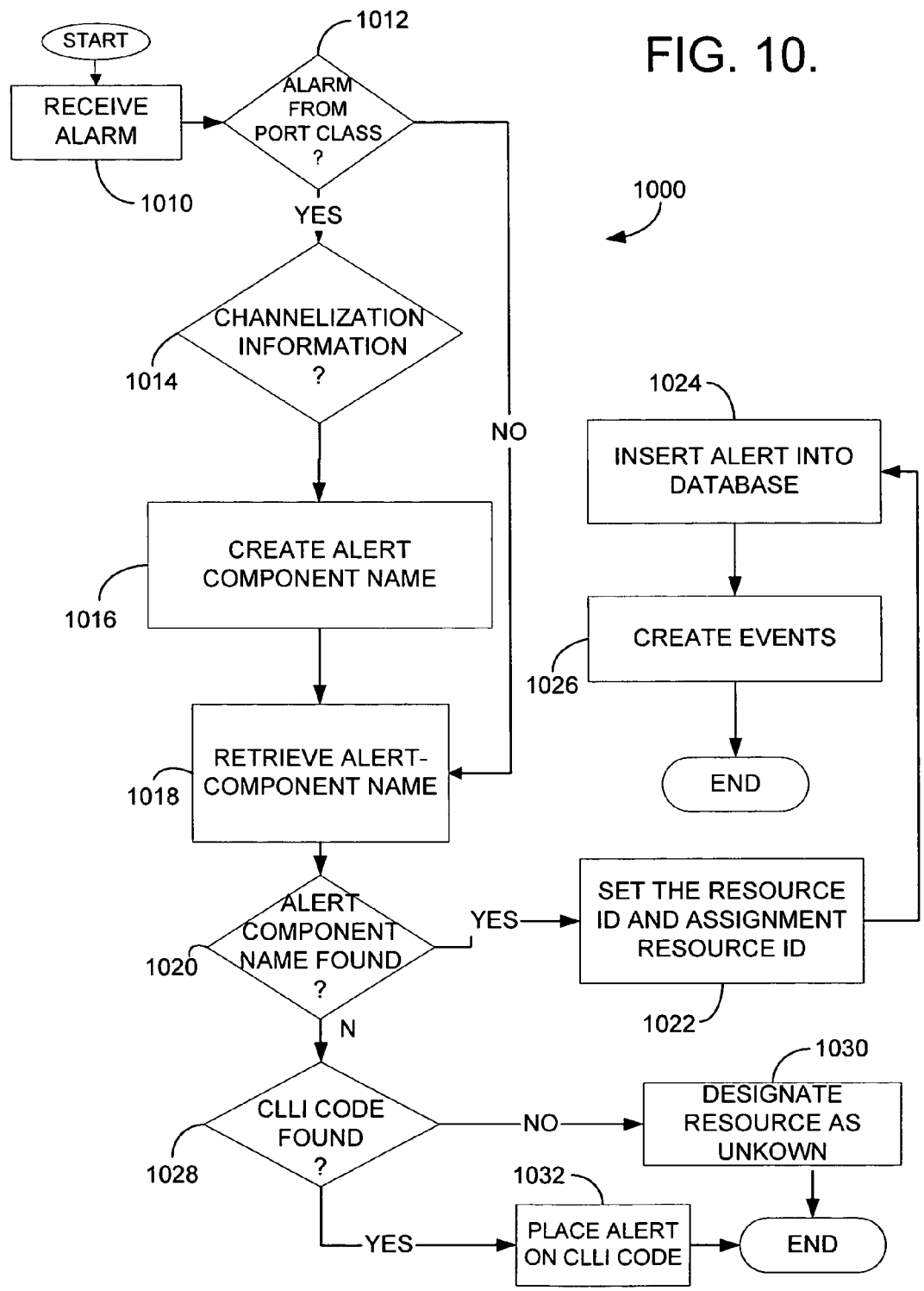
FIGS. 10-11 are flow charts of one embodiment of a process for alarm placement.

Referring now to FIG. 10, there is illustrated one embodiment of a process of alarm placement according to the present invention. A process 1000 begins with probe 920 receiving an alarm at a step 1010. Probe 920 then determines whether the alarm is from a port at a step 1012. At a step 1014, if the alarm is from a port, and the port address identification (AID) has channelization information, then, at a step 1016 probe 920 uses the channelization information on the AID to derive timeslot data. At step 1016, the time slot data is then added to the port AID to create an alert component name. At a step 1018, probe 920 searches AMO data structure 914 for the alert component name. The creation and population of AMO data structure 914 by topology client 910 is further discussed in relation to FIG. 11.

Continuing at a step 1020, if the alert component name is found, the aforementioned resource ID and assignment resource ID are added to the alert at a step 1022, creating an enriched alert. At a step 1024, the enriched alert is stored in data structure 917 to create a sum alert on the assignment resource. Essentially, all the sum alerts from different network elements affecting a common resource are grouped onto the assignment resource. Therefore, the placement of all sum alerts achieves horizontal correlation of alerts. At a step 1026 the event manager 922 process the sum alerts in sum alert data structure 917 on the assignment resources to create events, which may be displayed on a presentation device monitored by a technician. Events may be displayed on presentation devices, discussed hereinafter in relation to the display layer.

Figure 11:
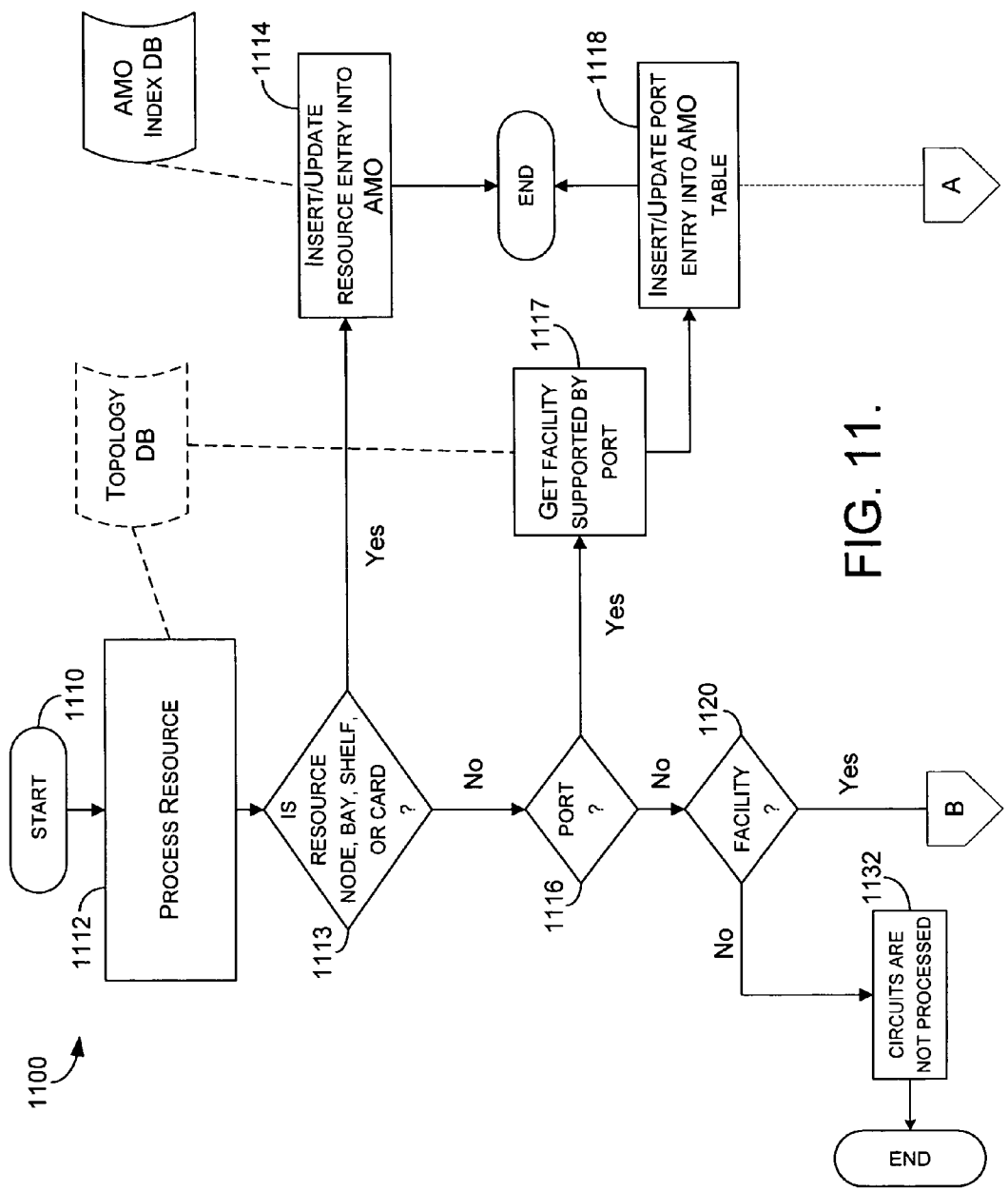

Referring now to FIG. 11, there is illustrated an embodiment of a process for populating AMO data structure 914 by topology client 910 according to the present invention. A process 1100 begins at a step 1110, where topology client 910 is invoked. At a step 1112, topology client 910 selects a network element from topology data structure 912 and retrieves a resource ID, an alert component name, and the type of network element. At a step 1113, if topology client 910 determines the network element is a node, bay, shelf, or card, topology client 910 inserts or updates AMO data structure 914 by setting the AMO data to the alert component name, and setting the resource ID and assignment resource ID to the resource ID retrieved at step 1112 from topology database 912. If, at step 1113, topology client 910 determines that the network element is not a node, bay, shelf, or card, topology client 910 determines at a step 1116 if the network element is a port. If the network element is a port, topology client 910 retrieves from topology data structure 912 the facility supported by the port at a step 1117. At a step 1118, topology client inserts or updates the AMO data structure 914 by setting the AMO data to the port name, the resource ID to the port resource ID, and the assignment ID to the facility resource ID.

If at step 1116, topology client 910 determines the network element is not a port, at a step 1120 topology client 910 determines if the network element is a facility. If the network element is not a facility, process 900 ends, but if the network element is a facility, topology client determines at a step 1122 if the facility is a top level facility. If the facility is a top level facility, at a step 1124 topology client retrieves the port or ports directly supporting the facility from topology data structure 912. At a step 1126, topology client inserts or updates for each port directly supporting the facility AMO data structure 914 by setting the AMO data to the port alert component name, the resource ID to the port resource ID, and the assignment resource ID to the facility resource ID. If, at step 1122, topology client 910 determines the facility is not a top level facility, then at a step 1128 topology client 910 retrieves each port indirectly supporting the facility from topology data structure 912. At a step 1130, topology client inserts or updates AMO data structure 914 for each port indirectly supporting the facility by setting the AMO data to the current port name with timeslot data, the resource ID to the current port resource ID and the assignment resource ID to the facility resource ID. Process 1100 begins anew for each network element in topology data structure 912 at step 1112.

Referring in combination to FIGS. 7-11, which illustrate alarm placement in the automated alarm handling schema of the present invention, provides the advantage of locating the root cause of alarms generated within a communications network in an efficient and timely manner. This is accomplished by associating alarms from various network elements to a common facility.

Sparing Engine

Figure 12:
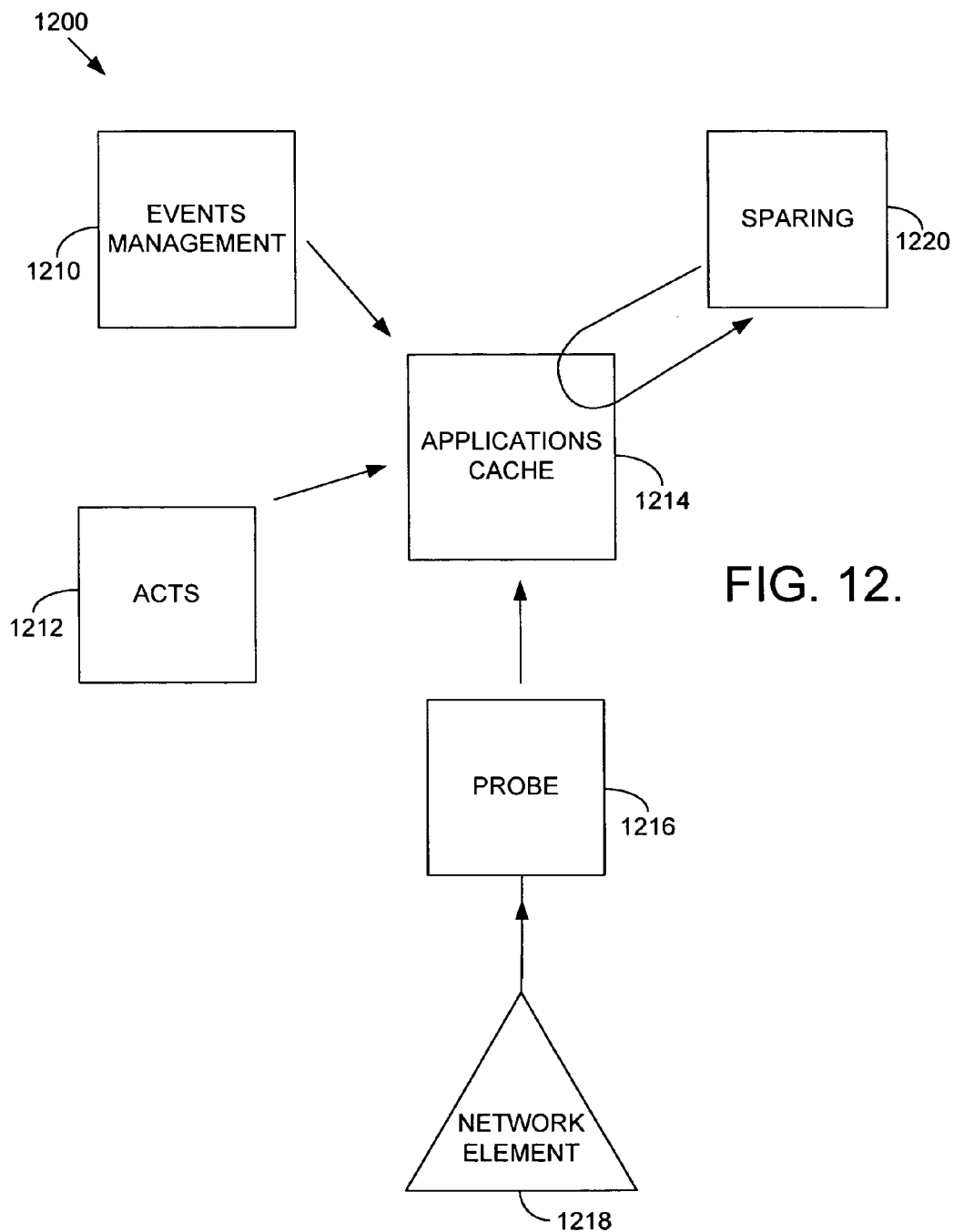
FIG. 12 is a block diagram of one embodiment of a system for determining when a service affecting problem in a communications network becomes a service impacting problem.

Referring now to FIG. 12, there is illustrated a block diagram of one embodiment of a system 1200 for determining when a service affecting problem in a communications network becomes a service impacting problem. System 1200 includes an event manager 1210, an applications cache transaction server (ACTS) 1212, an applications cache data structure 1214, a sparing engine 1220 and a probe 1216 coupled to a network element 1218. Event manager 1210, sparing engine 1220, ACTS 1212 and probe 1216 may include, but are not limited to, any server, processor, personal computer, laptop or other suitable device. Applications data structure 1214 includes, but is not limited to, a database, spreadsheet, or any other suitable storage devices.

In operation probe 1216 receives an alarm signal from network element 1218. Probe 1216 determines if the alarm is service affecting or non service affecting, and stores the alarm information in data structure 1214. Event manager 1210 correlates alarms relating to the same facility, and creates an event for each facility. ACTS 1212 populates data structure 1214 with topology information. Included in the topology information is whether or not a given facility in the communications network is supporting traffic or supporting customers. Sparing engine 1220 scans one or more event tables populated by that manager 1210 and stored in data structure 1214. Sparing engine 1210 searches for events that are determined to be service affecting by probe 1216 on facilities supporting traffic, as determined by ACTS 1212. If a facility associated with an event is an OM, OC48, OC12, or OC3 facility, sparing engine 1220 examines children of the aforementioned facility and calculates the total number of child facilities. For each facility, sparing engine 1220 scans one or more tables in data section 1214 to ensure that an outage event has been associated with them. Sparing engine 1220 calculates a percentage of child DS3 facilities signaling an outage, and, if this percentage is over a predetermined value or threshold, the event is set to be service impacting. In one embodiment, if the facility is a DS3 facility, sparing engine 1220 marks the event as service impacting, since most DS3 facilities are unprotected in a communications network. In another embodiment, if the facility is a DS3 facility, sparing engine 1220 calculates a percentage of child facilities (DS1 facilities) that have an outage and if that percentage is over a predetermined value then sparing engine 1220 sets the event to be service impacting.

Figure 13:
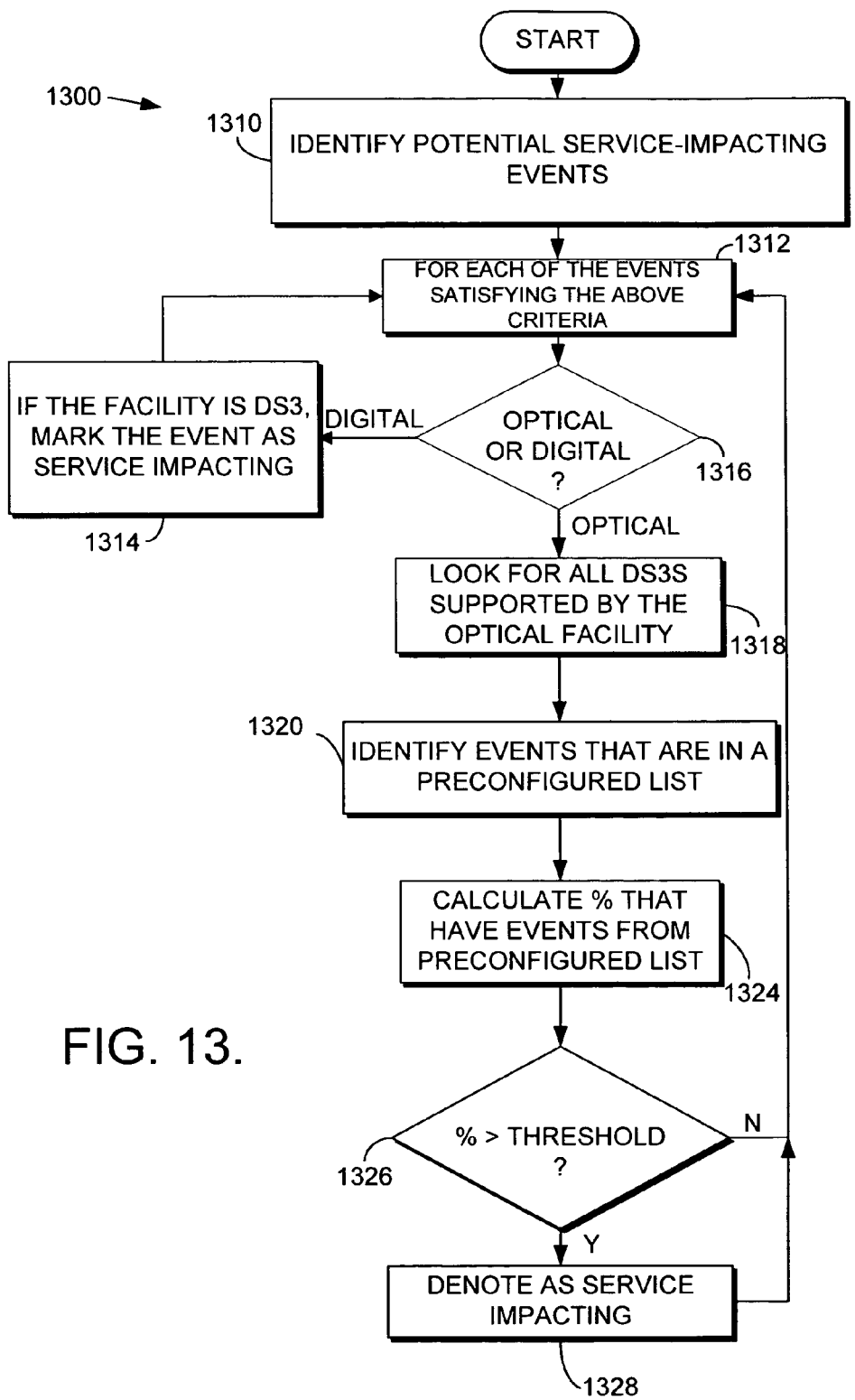
FIG. 13 is a flow chart illustrating an embodiment of a process for evaluating whether a service affecting event is in actuality a service impacting event.

Referring now to FIG. 13, there is illustrated an embodiment of a process for evaluating whether a service affecting event is in actuality a service impacting event. Process 1300 begins at a step 1310 where sparing engine 1220 scans event tables in applications cache data structure 1214 for events that are on facility resources with service affecting status marked true and with a traffic bearing count greater than zero and a service impacting status marked false. And a step 1312, for each of the events satisfying the above criteria sparing engine 1220 determines if the facility is optical or digital at a step 1316.

If the facility is a DS3 facility, sparing engine 1220 marks the event as service impacting, since most DS3s are unprotected in common communications networks. If, however, the facility is optical, sparing engine 1220 looks for all DS3s supported by the optical facility at a step 1318. At a step 1319, sparing engine 1220 looks for DS3 events associated with the optical facility in a preconfigured list included in applications cache data structure 1214. The events may be grouped into three categories: red, yellow and blue. A red event is equivalent to a loss of signal, a yellow event is equivalent to a remote alarm indication, and a blue event is an alarm indication signal. In other words, a red event indicates the receiver did not receive a signal, a yellow event indicates a receiver is indicating to the network that the signal has been dropped, and a blue event indicates that the receiver is inserting a keep alive signal, indicating it is not receiving a signal but is still sending a signal to prevent damage to network equipment. At step 1319, sparing engine 1220 scans application data structure 1214 for red, yellow and blue DS3 events. At a step 1320, sparing engine 1220 calculates a percentage of DS3s that have red, yellow and blue events that are labeled as service affecting with a traffic bearing count greater than zero. At a step 1322, sparing engine 1220 calculates that the percentage of DS3s reporting service affecting events is greater than a preconfigured value. The preconfigured value is an arbitrary percentage value that can be determined by the technician familiar with the configuration of the network. The sparing engine 1220 waits for a preconfigured amount of time, after the creation of the service affecting event on the DS3 facility, before calculating the percentage of DS3s having events on them. The preconfigured amount of time can range anywhere from zero seconds to ten seconds. If at step 1322 the percentage of DS3s showing the percentage of DS3s having service affecting events with traffic bearing counts greater than zero is greater than the preconfigured value, the sparing engine 1220 marks the event on the optical facility as service impacting. If the percentage is less than the preconfigured value, process 1300 begins again at step 1312. If the event is marked on the optical facility as service impacting, this demonstrates that the protection switch on the optical facility has not been successful and that DS3 children have been impacted due to the failure of the optical parent facility. The sparing engine provides the advantage of being able to identifying the severity of a network failure by identifying and separating alarms or events into two categories, namely, service affecting and service impacting. A service impacting alarm allows a technician monitoring a communications network to focus the resources of the monitoring technician on resolving severe customer outages. Furthermore, the problem of determining at what point a service affecting alarm becomes a service impacting alarm previously required a complex understanding of protection schemes for all network devices. This includes parent/child relationships, network topology, and the ability to accurately judge what percentage of child component failures resulted in a failure in a protection scheme. Once this information is obtained or calculated, the result is the ability to differentiate between a non emergency and emergency network failure.

Network Events Processor

Figure 14:
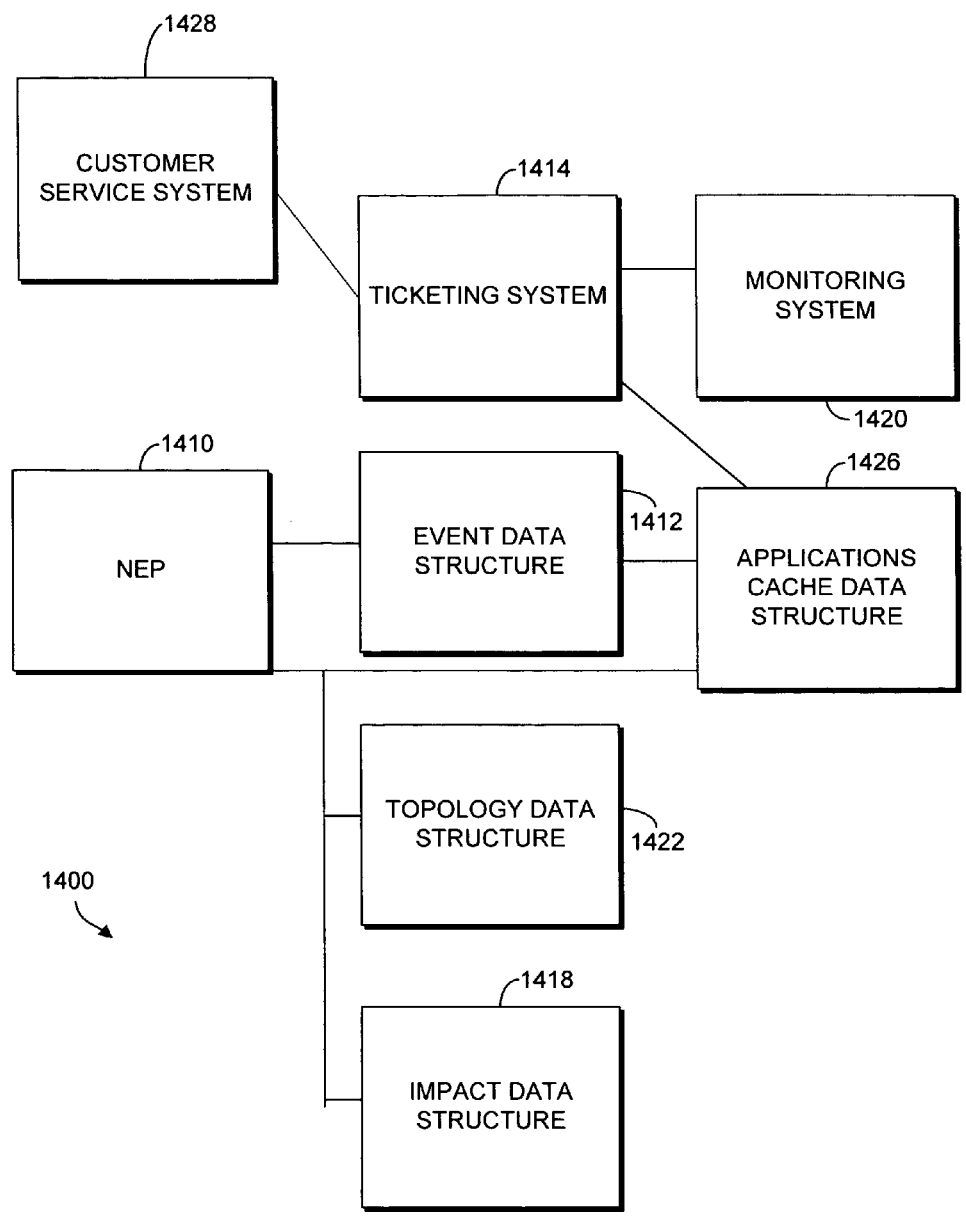
FIG. 14 is a block diagram of one embodiment of a system for correlating different tickets generated in a network communications system according to the present invention.

Referring now to FIG. 14, there is illustrated a system 1400 according to the present invention. System 1400 either creates, updates, clears, or closes a U ticket that is automatically created by NEP 1410, created by ticketing system 1414, or manually created by monitoring system 1420. NEP 1410 performs the aforementioned functions by relating the U ticket to tickets created by customer service system 1428 (an X (proactive) or C (customer initiated) ticket) in a parent-child relationship.

Turning again to FIG. 14, system 1400 comprises a network events processor (NEP) 1410, a display event data structure 1412, a topology data structure 1422, an impact data structure 1418, a ticketing system 1414, a monitoring system 1420, an applications cache data structure 1426, and customer service system 1428. NEP 1410, ticketing system 1414, customer service system 1428, and monitoring system 1420, include, but are not limited to, personal computers, laptops, processors, servers, or any other suitable device. Display event data structure 1412, impact data structure 1418, applications cache data structure 1426, and topology data structure 1422 include, but are not limited to, a database, a spreadsheet, or any other suitable storage device. Furthermore, topology data structure 1422, impact data structure 1418, and display event data structure 1412 may be housed in the same data structure or in separate data structures.

In operation, system 1400 may perform three parallel processes. In one embodiment of a process (FIG. 15A) NEP 1410 periodically scans data structure 1421 for service impacting events and automatically creates a U ticket in data structure 1426. NEP creates an impact list in data structure 1418 and finds and associates other tickets, such as C and X tickets, in data structure 1426 based upon their relationship to the impact list. NEP updates the service impacting event in data structure 1421 based upon information in the related tickets. In another embodiment of a process (FIG. B), NEP 1410 scans data structure 1426 for U tickets created by ticketing system 1414 that are to be cleared or closed. NEP 1410 associates related tickets that are the children of the U tickets, created by customer service system 1428 (X and C tickets), based upon their impact lists in data structure 1418, with a new U ticket. The related service impacting event stored in display event data structure 1412 is updated based upon information included in the associated tickets. System 1400 further processes customer tickets (X and C tickets) from customer service system 1428 and scans data structure 1426 to associate the customer tickets with a U ticket. In yet another embodiment of a process (15C), a U ticket may be manually created by monitoring system 1420. NEP 1410 performs substantially the same aforementioned functions and updates event data structure 1412 accordingly.

Figure 15A:
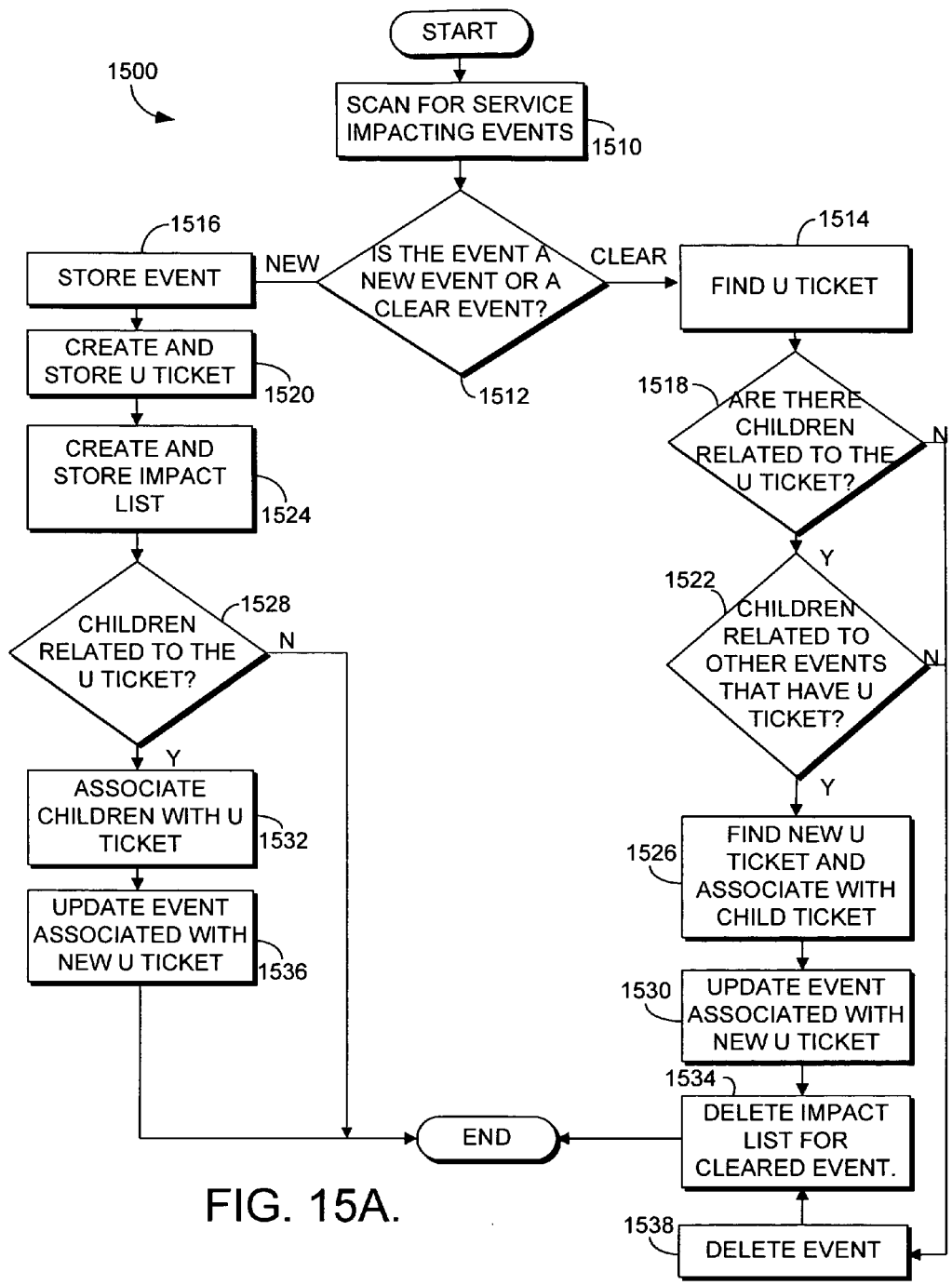
FIGS. 15A-C are flow charts illustrating several embodiments of processes performed by the system of FIG. 14 according to the present invention.
Figure 16:
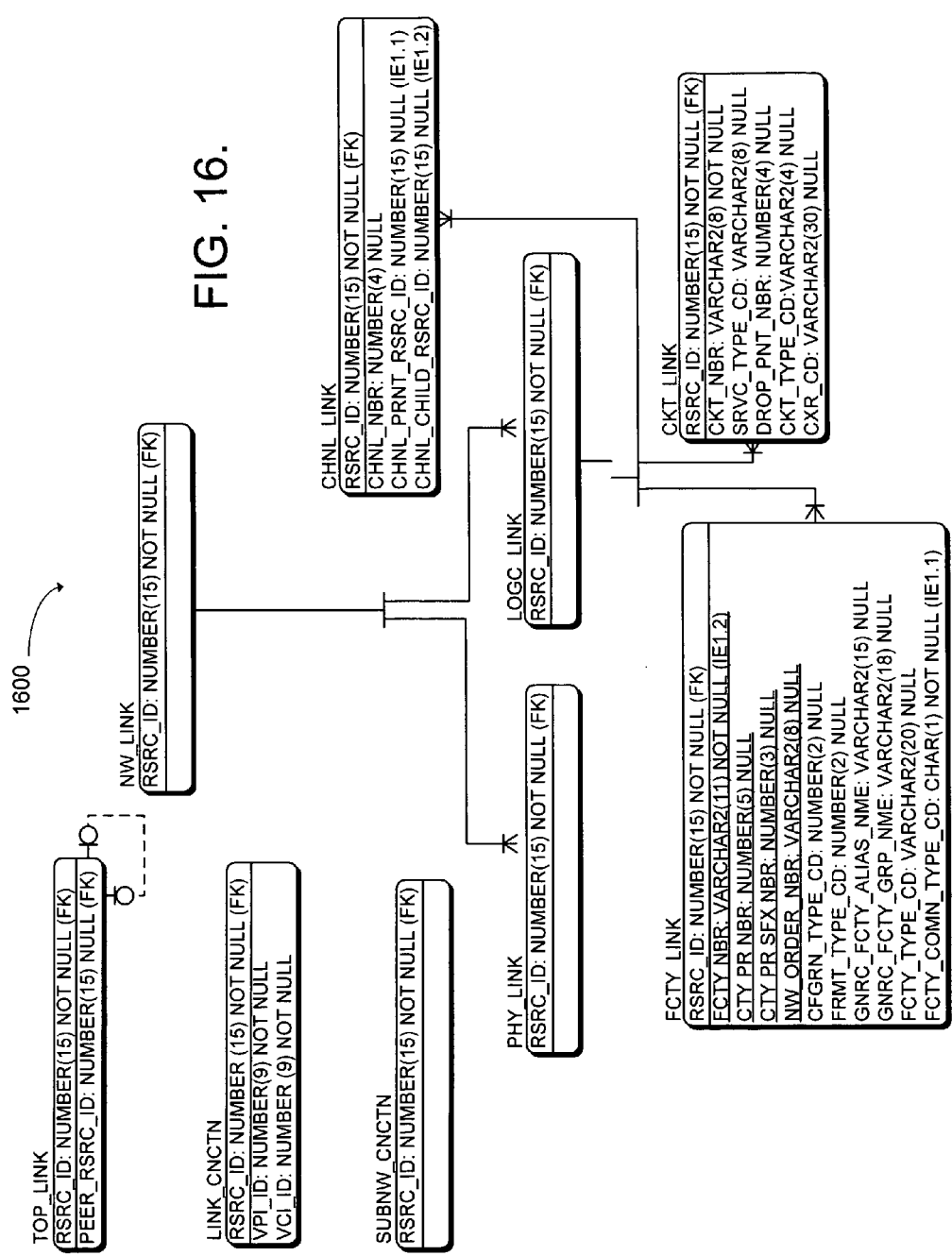
FIGS. 16-17 illustrate embodiments of data structure schemas for the data structures of the system of FIG. 14.
Figure 17:
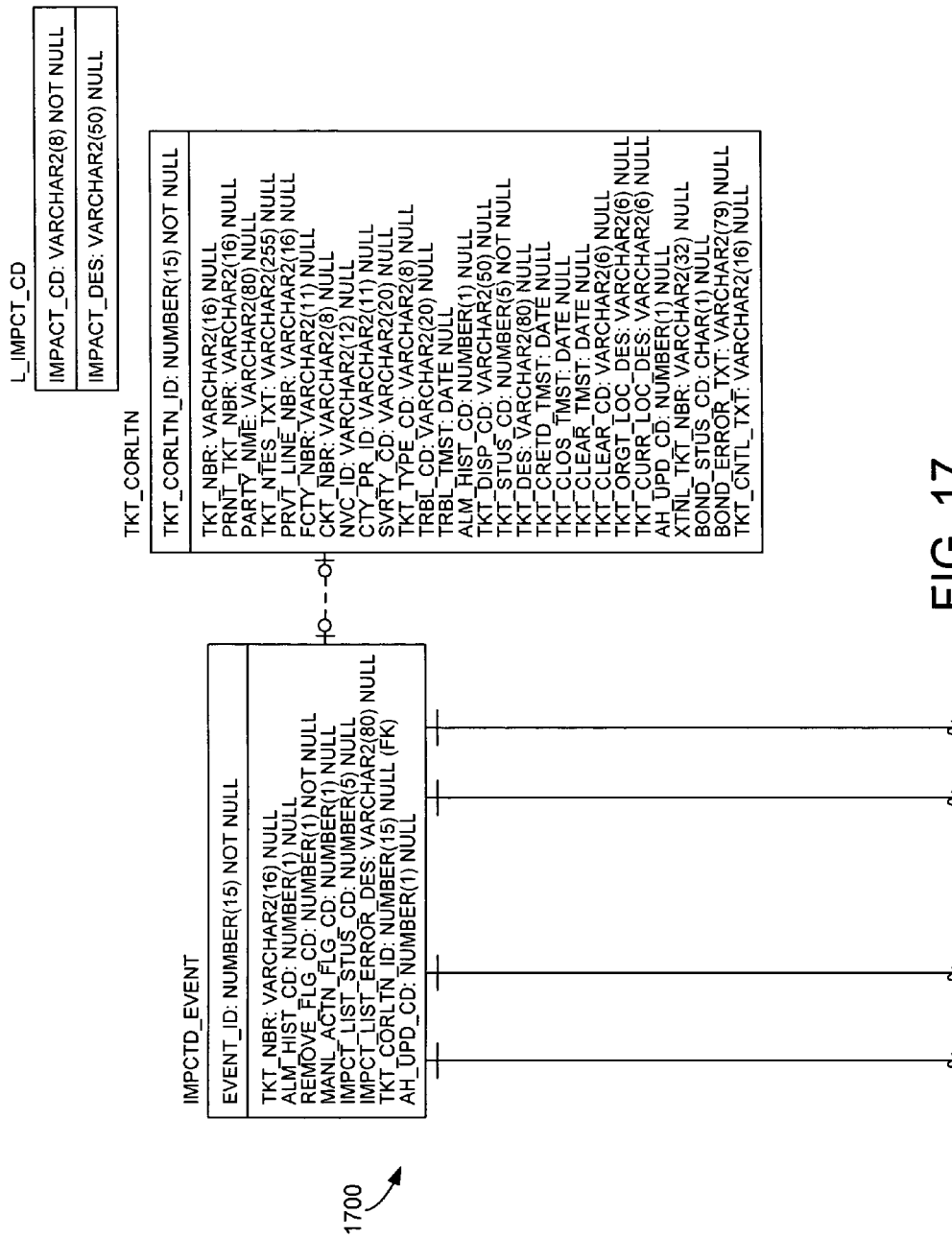

Referring now to FIG. 15A, there is illustrated an embodiment of a process 1500 involving NEP 1410. At a step 1510, NEP 1410 periodically scans data structure 1412 for service impacting events. At a step 1512, NEP 1410 determines if the event is new or if the event needs to be cleared from data structure 1412. If the event is new, process 1500 continues at a step 1516, where the new event is stored in data structure 1412. At a step 1520, a new U ticket related to the event is created and stored in data structure 1426. At a step 1524, an impact list is created and stored in impact data structure 1418. The impact list includes impacted facilities, circuits, private lines and virtual circuits affected by the new event. One embodiment of a partial schema 1600 is shown in FIG. 16 for impact data structure 1418. An impact list is derived from topology data structure 1422. One embodiment of a partial schema 1700 of data structure 1422 is illustrated in FIG. 17.

Still referring to process 1500 of FIG. 15A, at a step 1528, NEP 1410 determines if there is a correlation between the new U ticket and other tickets within the system (children of the U ticket, or customer tickets). NEP 1410 scans the impact lists of data structure 1418 (FIGS. 14 and 16) and determines if the impact list of the U ticket matches the impact list of other tickets (U or customer tickets) stored in data structure 1426. If there are related tickets, process 1500 proceeds at a step 1522 and correlates the related tickets with the U ticket. The related tickets may be updated with the association to a parent U ticket. If there are no related tickets, process 1500 ends processing the new event.

Turning to step 1512 of process 1500, if the event is to be cleared from event data structure 1412, process 1500 proceeds at a step 1514 to find the related U ticket in data structure 1426. At a step 1518, NEP 1410 determines if there are any children related to the U ticket to be cleared. If, after comparing the impact list of the U ticket, which includes impacted facilities, circuits, private lines and virtual circuits (FIG. 16) affected by the event, to other ticket impact lists, no children are found, then NEP 1410 deletes the event from data structure 1412 at a step 1538. Further, the associated U Ticket and impact list are deleted from data structure 1426. If at step 1518, child tickets (either customer or other U tickets) are found, at a step 1522, NEP 1410 scans impact lists of other tickets to determine if the child tickets are related to other tickets. If there are still no other related tickets, steps 1538 and 1534 are repeated for the child tickets. At a step 1526, if NEP 1410 does relate the child tickets to another U ticket based on their respective impact lists, the child tickets are correlated to the new U ticket in data structure 1426. At a step 1530, the event to be cleared is updated with the impact list of the new U ticket in data structure 1412. At step 1534, the old U ticket and associated impact list are deleted from data structures 1426 and 1418.

Figure 15B:
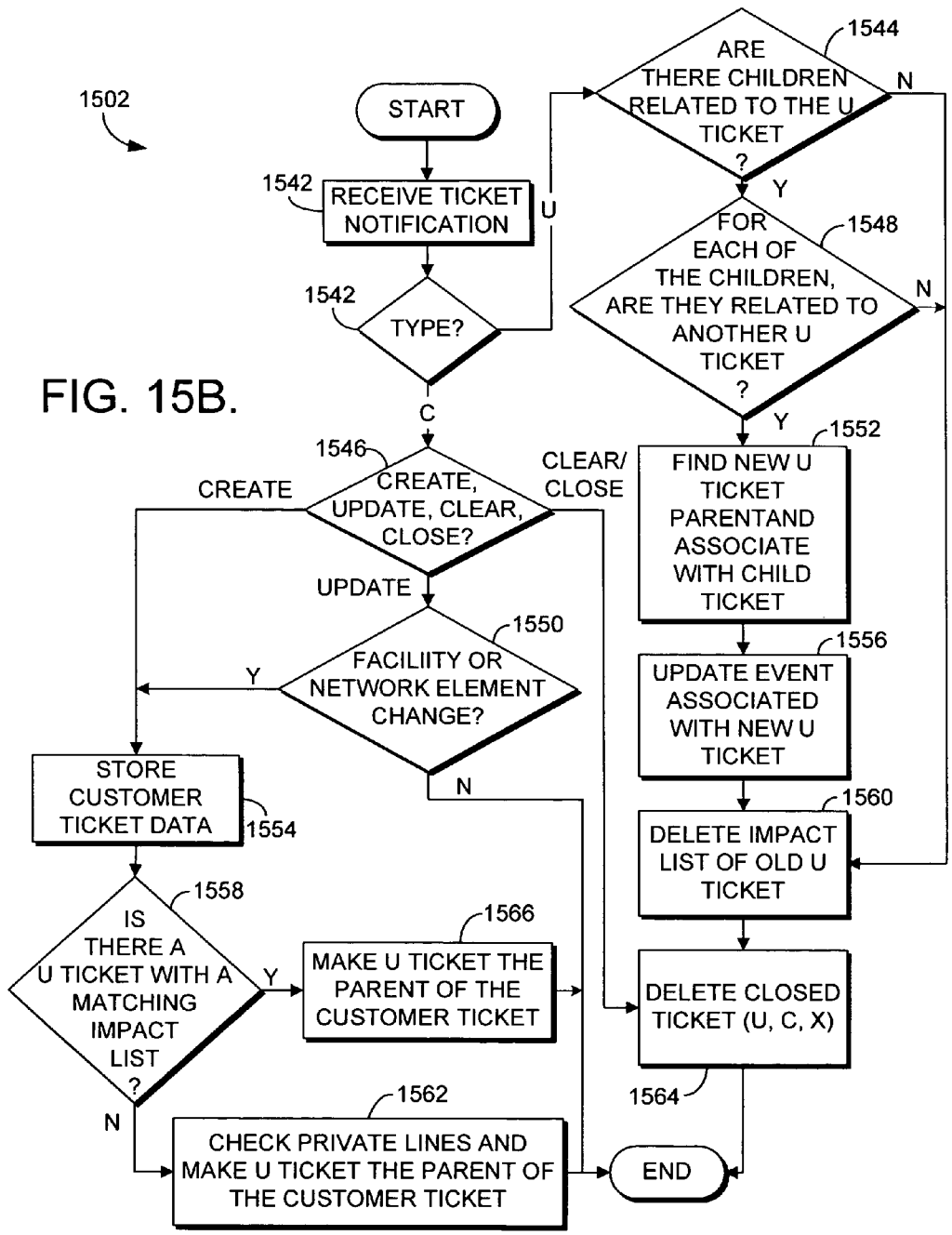

Referring now to FIG. 15B, there is illustrated an embodiment of a process 1502 involving NEP 1410. Process 1502 receives U ticket clear and close notifications from ticketing system 1414 and creates, updates, clears and closes customer tickets generated by customer service system 1428. At a step 1540, NEP 1410 receives a U ticket clear/close or customer ticket from ticketing system 1414 or customer service system 1428. At a step 1542, NEP 1410 determines whether the ticket is a U ticket or a customer ticket. If the ticket is a U ticket to be cleared and closed, at a step 1544, NEP 1410 determines if there are related child tickets in data structure 1426. If there are not any child tickets related to the U ticket, at a step 1560, the impact list associated with the U ticket in data structure 1418 is deleted. At a step 1564, the U ticket is deleted from data structure 1426. If child tickets are related to the U ticket at step 1544, at a step 1548, NEP 1410 determines, for each of the children, by searching impact data lists stored in data structure 1418 (FIG. 16), if the child ticket is related to another U ticket. If no relation is found, at step 1560 the impact list in data structure 1418 is deleted for the child and U ticket and the tickets are deleted from data structure 1426. At step 1548, if a relation is found, at a step 1552, the child and the U ticket are correlated in data structure 1426. At a step 1556, the event associated with the new U ticket is updated in data structure 1412, and the impact list of the old U ticket is deleted at step 1560 and the old U ticket is deleted at step 1564.

If, at step 1542, the type of ticket is a customer ticket (either X or C ticket), then at a step 1546 NEP 1410 determines if the action requested from system 1428 is create, update, or clear and close action. If a new customer ticket is created, then at a step 1554, NEP 1410 stores the customer ticket data (facilities, circuits, private lines, virtual lines associated with the customer data). At a step 1558, NEP 1410 scans impact data structure 1418 for a U ticket with a matching impact list. In other words, do the facilities, circuits, or virtual lines associated with the customer match an impact list with the same information. If an associated U ticket is found, NEP 1410 correlates the U ticket with the customer (child) ticket in data structure 1426. If no matching impact list is found at step 1558, then at a step 1562 NEP 1410 checks private lines in impact lists of impact data structure 1418 and correlates the customer ticket to the U ticket.

If the requested action is to update a customer ticket, at a step 1550 NEP determines if a facility or network element has been updated, and if so, continues through steps 1554, 1558, and 1562 or 1566 to correlate the updated customer ticket to a U ticket in data structure 1426. If the requested action is a clear and close of a customer ticket, NEP 1410 proceeds with step 1564 and deletes the customer ticket from data structure 1426.

Figure 15C:
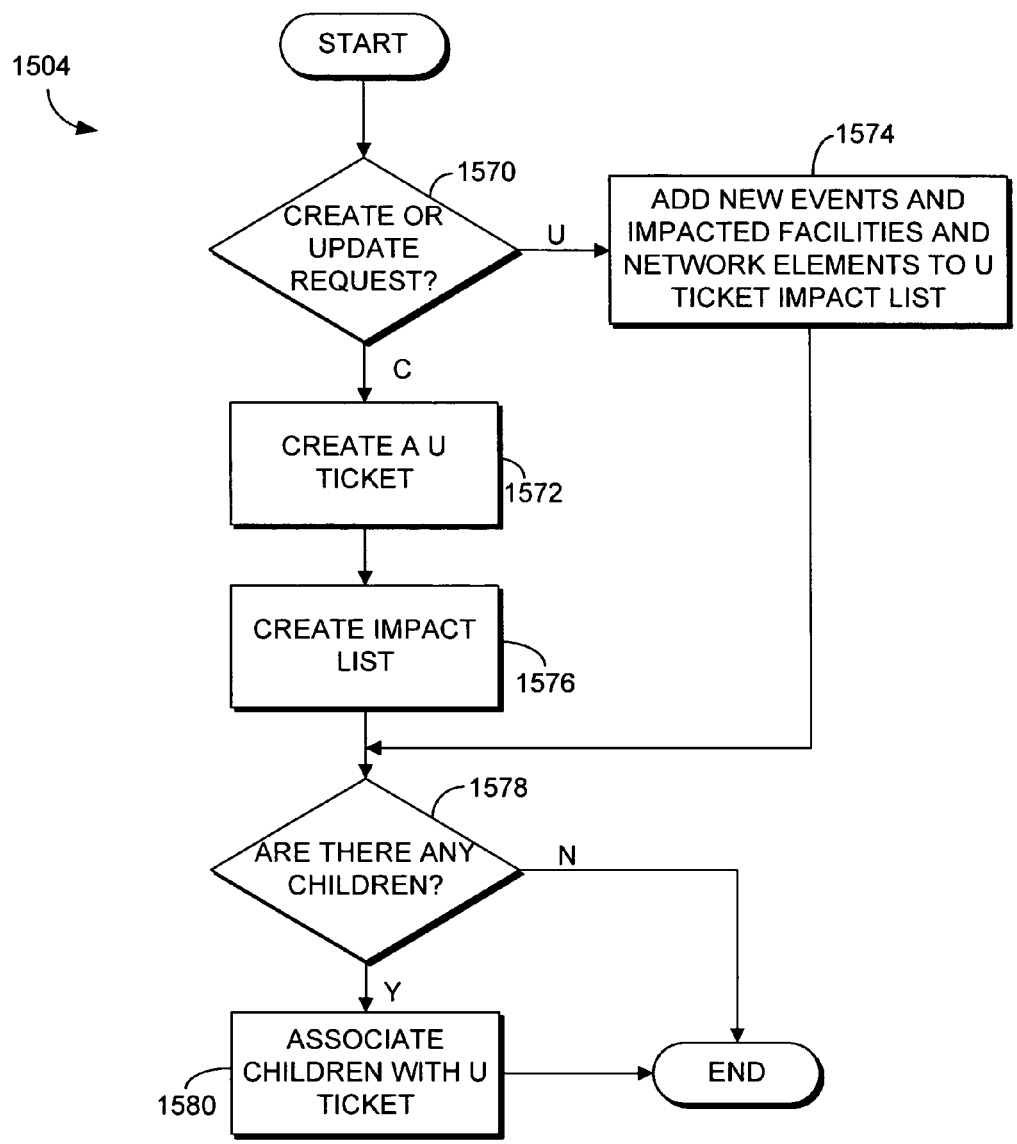

Turning now to FIG. 15C, there is illustrated another embodiment of a process 1502 involving NEP 1410. Process 1502 receives requests from monitoring system 1420 to create a new U ticket or update an existing U ticket. At a step 1570, NEP 1410 determines if the request is to create a new U ticket for an event or update an existing U ticket. If the request is to create a new ticket, at a step 1572, the new ticket is created in data structure 1428. At a step 1572, an impact list in impact data structure 1418 is created with the affected facilities, circuits, virtual circuits and private lines related to the event. At a step 1578, NEP 1410 determines if there are any other tickets in data structure 1426 with matching impact lists in data structure 1418. If the tickets are found, the tickets are made the children of the created U ticket.

At step 1570 the request may be to update an existing U ticket. This could mean monitoring system 1420 has added new events or new facilities have been affected that should be added to the impact list of an existing U ticket. At a step 1574, the impact list of data structure 1418 relating the existing U ticket is updated, and event data structure 1412 is updated with the new event. At steps 1578 and 1580, NEP 1410 determines if there are any existing U tickets that need to be correlated with the updated U ticket, and the correlation is stored in data structure 1426.

In the embodiments of FIGS. 15A-C, each U ticket comprises notes, which denote which types of facilities and circuits are impacted by the associated event. For example, the notes track the percentage of OM, OC, and DS-3 facilities that are impacted as determined by the impact list. These notes or "counts" of the number of facilities affected may be accessed by monitoring system 1420 to calculate statistics displayed to a presentation device, discussed below.

GUI Processor and Push Technology

Figure 18:
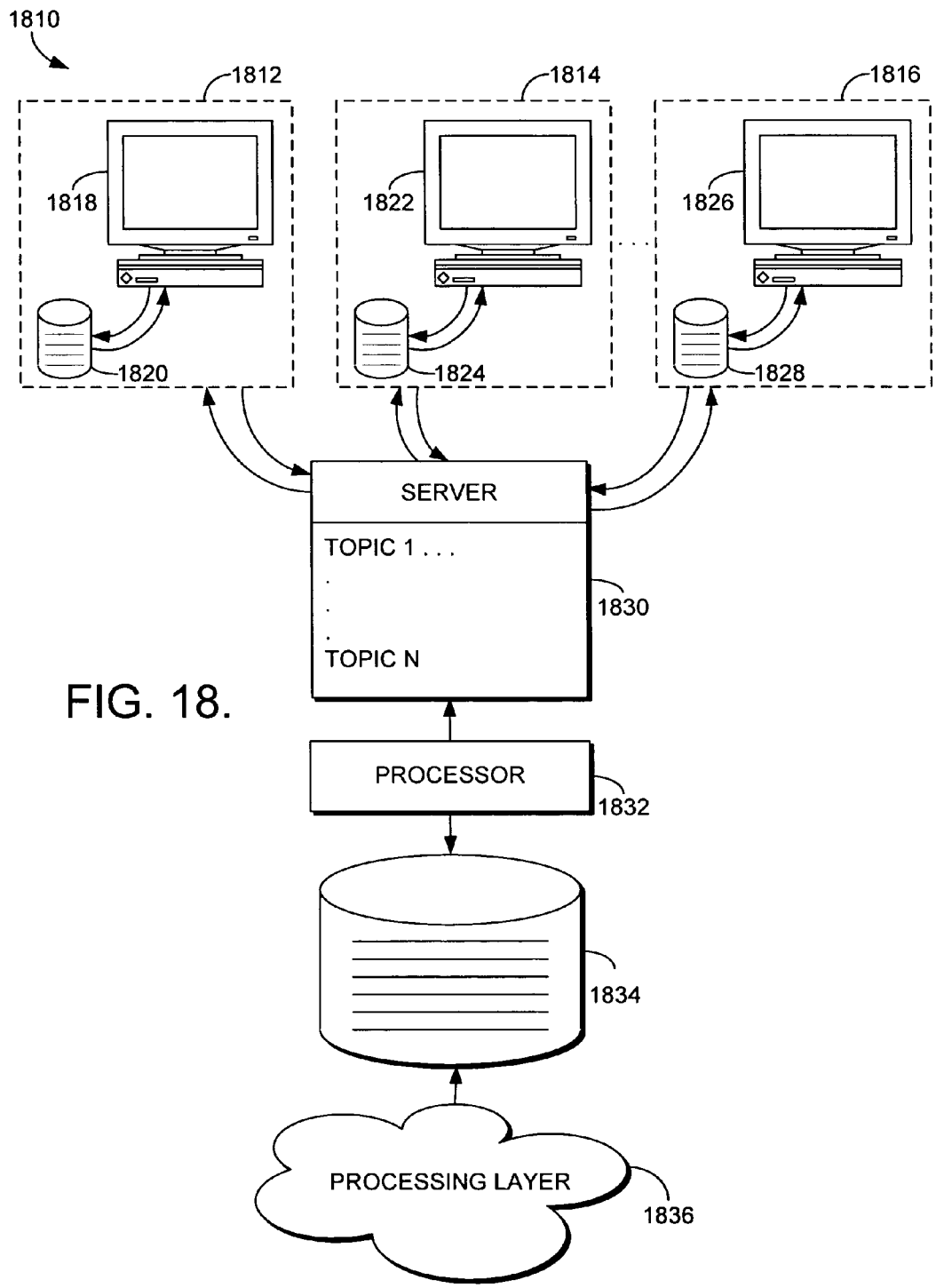
FIG. 18 is an exemplary embodiment of an event display system.

Turning now to FIG. 18, there is illustrated an exemplary embodiment of an event display system 1810 according to the present invention. System 1810 includes clients (for example, presentation components or users) 1812, 1814, and 1816, a messaging server 1830, a processor 1832, and a display data structure 1834. Clients 1812, 1814, and 1816 further comprise client servers 1818, 1822, and 1826 and associated client data structures 1820, 1824, and 1828 coupled to messaging server 1830. Messaging server 1830, processor 1832, and client servers 1818, 1822, and 1826 may include, but are not limited to, personal computers, laptops, workstations, and other suitable devices. Furthermore, data structure 1834 and client data structures 1820, 1824, and 1828 include, but are not limited to databases, spreadsheets or other suitable storage structures.

In system 1810, clients 1812, 1814, and 1816 monitor events (set of alarms relating to a network element) in a communications network, while messaging server 1830 sends update data to clients based upon each client's subscription. Processor 1832 sends the update data to messaging server 1830. Update data is obtained from data structure 1834 which is populated with event data on the various network elements within the communications network.

As used in this application, the term pushing refers to a technology whereby a server, for instance the server 1830 of FIG. 18, sends only specified data, for example the aforementioned update data, to a client (any of the clients 1812, 1814, and 1816). In other words, the server pushes or sends certain data to certain clients. In what is termed pull technology, in contrast to push technology, a client must request that a specific type of data be sent to the client. As previously mentioned, one problem with pull technology is that it is bandwidth intensive which creates scalability problems and adds costs and complexity. System 1810 utilizes push technology to send update data to clients 1812, 1814, and 1816.

The aforementioned client data structures 1820, 1824, and 1828 are populated with update data (data referring to updated event data) according to the respective client's subscriptions from messaging server 1830, discussed in greater detail below. A subscription is the type of updated event data the client may wish to view or monitor. For example, client 1812 may monitor SONET (Synchronous Optical Network) related event data. Likewise, client 1814 may monitor MAN (Metropolitan Area Network) event data. However, client 1816, who may be in a supervisory position over the clients 1812 and 1814, may monitor both SONET and MAN event data. Client data structures 1820, 1824 and 1828 associated with the respective clients 1812, 1814, and 1816 may be populated with the appropriate update data relating to the clients 1812, 1814, and 1816 subscriptions. Client servers 1818, 1822 and 1826 are in communication with and may receive data from their respective data structures 1812, 1814 and 1816. Further, clients 1812, 1814 and 1816 may view the update data on respective client servers 1818, 1822, and 1826 through, by way of example, a graphical user interface (GUI). The above example is for illustrative purposes only and may take the form of other embodiments according to the present invention.

With continued reference to FIG. 18, processor 1832 pushes update data to the server 1830. The processor 1832 retrieves the update data from the data structure 1834 and categorizes the update data into event topics before pushing the update data to server 1830. Exemplary event topics may include, but are not limited to statistics on event data, DWDM (Dense Wavelength Division Multiplexor) related event data, WBDCS (Wide Band Digital Cross-connect Switch) related event data, BBDCS (Broadband Digital Cross-connect Switch) related event data, NBDCS (Narrowband Digital Cross-connect Switch) related event data, SONET ADM (optical Add-Drop Multiplexor) related event data, SONET MUX (optical Multiplexor) related event data, and MAN related event data. Server 1830 categorizes update data according to event topic, pushes the categorized updated event data to the appropriate client data structures 1820, 1824, and 1828 according to their respective subscriptions.

Figure 19:
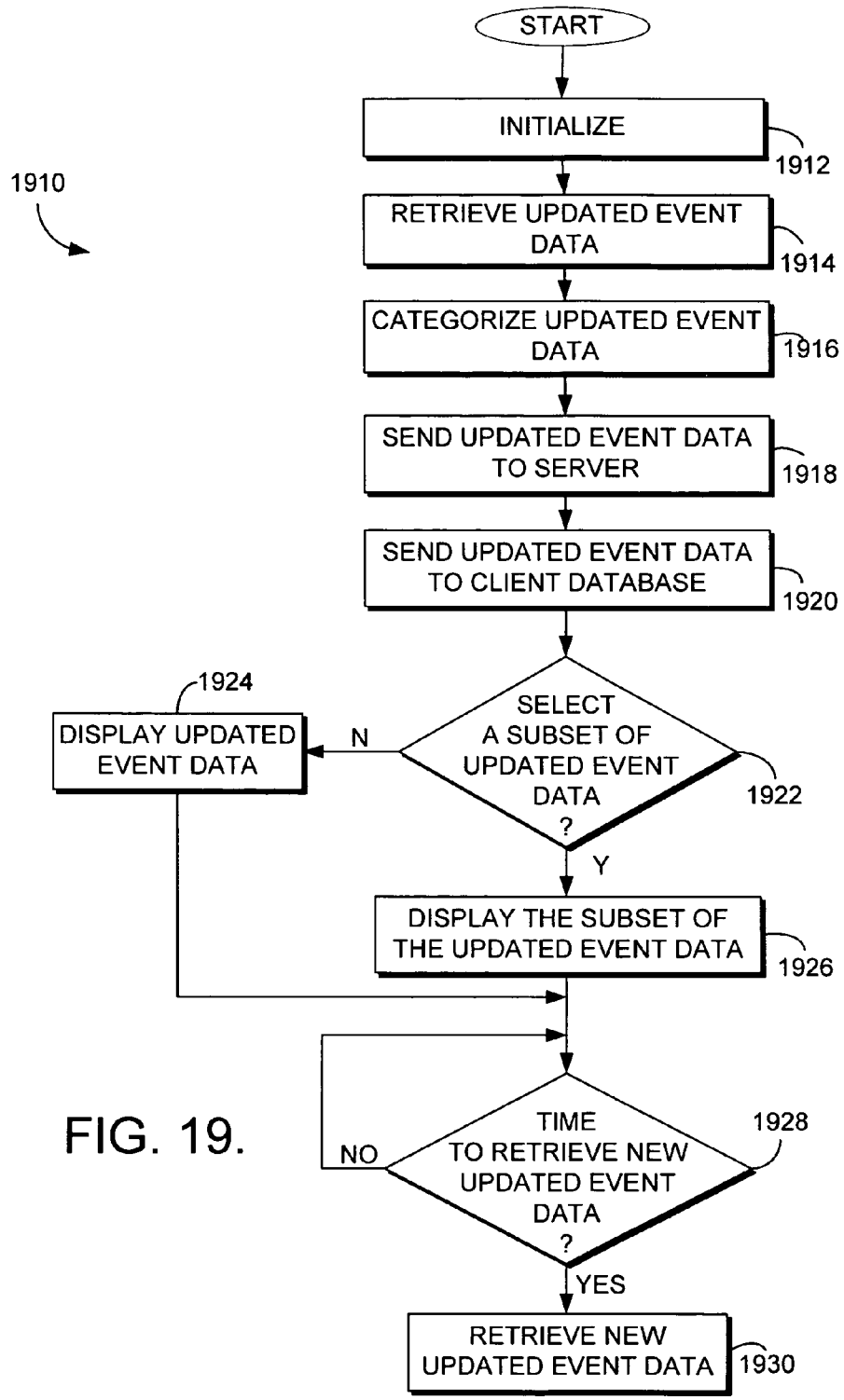
FIG. 19 is a flow chart illustrating one embodiment of the process implemented by the system of FIG. 18.

Referring now to FIG. 19, there is illustrated a flow chart of one embodiment of the present invention. A process 1910, implemented by system 1810 of FIG. 18, initiates preprocessing or initialization steps at a step 1912 to initialize processor 1832, server 1830 and clients 1812, 1814, and 18 16 with appropriate initialization data. Step 1912 will be discussed in further detail with reference to FIG. 20. At a step 1914, the processor 1832 pulls (or retrieves) updated event data from data structure 1834 based upon the state of a status flag associated with the event data. In one embodiment, the status flag may be a bit (a logical 1 or 0) inserted into the event data to indicate that the event data has been updated. Once the event data has been updated, the status flag changes state (for example, from 1 to 0) to indicate that update data is available. Step 1914 will be discussed in more detail in relation to FIG. D.

At a step 1916, the processor 1832 categorizes update data based upon event topic. For example, all updated event data relating to the SONET ADMs in a communications network may be categorized together, while all data relating to the NBDCSs in the communications network may be categorized together. At a step 1918, the processor A32 pushes the categorized updated event data to the server 1830. The server 1830 may comprise channels that correspond to and receive the categorized update data from processor 1832. Server 1830, at a step 1920, then pushes the appropriate update data to client data structures 1820, 1824, and 1828 based upon respective subscriptions.

At a step 1922 clients 1812, 1814 and 1816 may elect to view (quick filter) only a subset or subsets of the subscribed updated event data included in client data structures 1820, 1824, and 1828 on respective client servers 1818, 1822 and 1826. For example, client 1812 may have a subscription to monitor SONET ADM update data included in the client database 1820. Client 1812 may further elect to view only the SONET ADM update data that is service impacting. This election by client 1812 to view only service impacting update data is termed quick filtering. If quick filtering is not selected at step 1922, the client may view all subscribed update data at a step 1924.

At a step 1928, processor 1832 decides if new event updates should be retrieved from the data structure 1834. Processor 1832 is preprogrammed to query data structure 1834 after a predetermined time interval for new update data. If the predetermined time interval has lapsed, the processor 1832 returns to step 1914 to retrieve the update data from data structure 1834.

Figure 20:
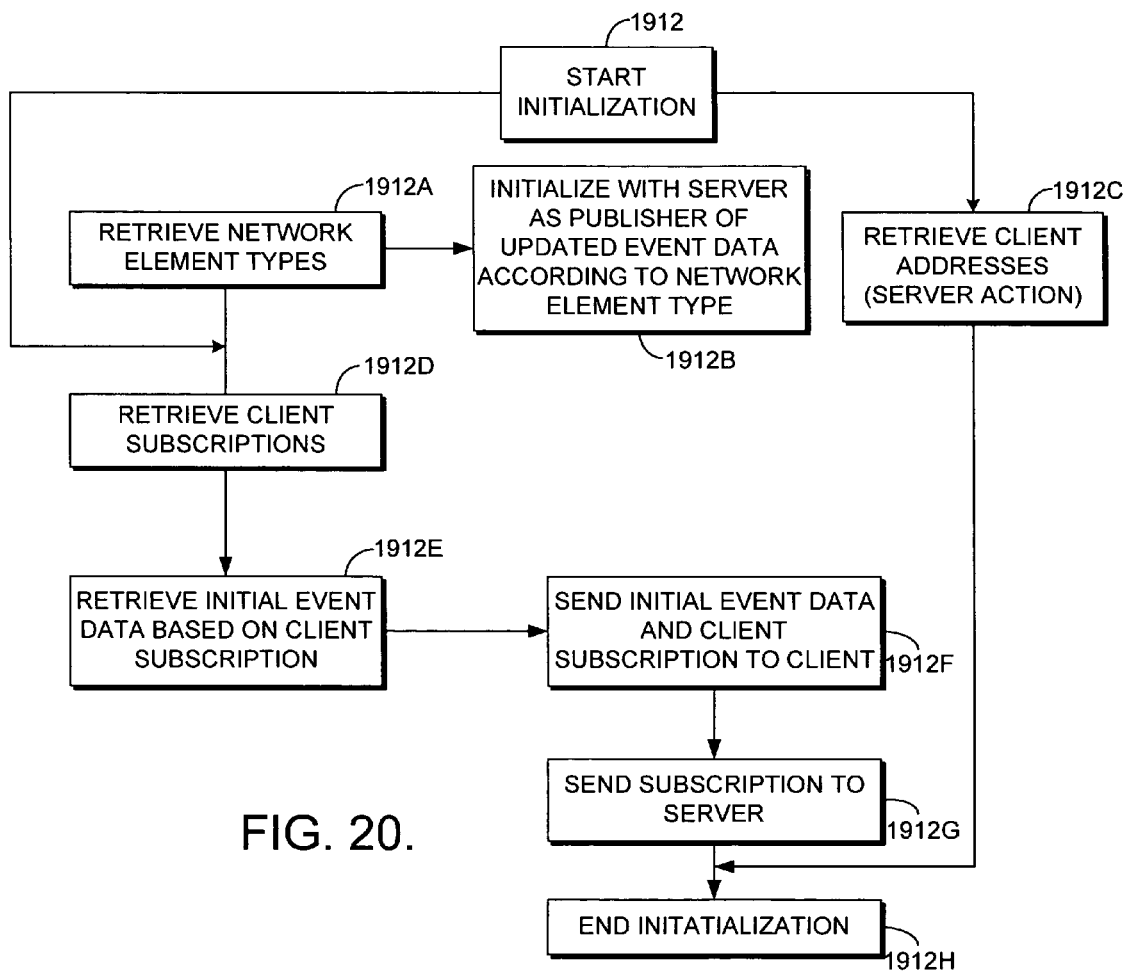
FIG. 20 is an embodiment of a more detailed flowchart of the initialization step of FIG. 19.

Referring now to FIG. 20, there is illustrated a more detailed flowchart for one embodiment of step 1912 of FIG. 19, which illustrates the initialization of processor 1832, server 1830 and client servers 1818, 1822, 1826 along with related data structures 1820, 1824 and 1828. At a step 191218, initialization of processor 1832 begins with retrieving network element types from a network element type table in the data structure 1834. Processor 1832, at a step 1912B, communicates with server 1830 that processor 1832 will be sending update data categorized by network element type to the appropriate channel on server 1830. At a step 1912D, the processor 1832 retrieves client subscription data from subscription tables in the data structure 1834. At a step 1912E, the processor 1832 retrieves initial event data (not update data) based on client subscription. At a step 1912F, the processor 1832 sends the initial event data and subscription data to clients 1812, 1814, and 1816 based on their respective subscriptions.

The initialization of clients 1812, 1814 and 1816 begins at a step 1912G. Client servers 1818, 1822, and 1826 receive their respective client subscription data and the initial event data from the processor 1832 and store the initial event data on their respective client databases 1820, 1824 and 1828. This is to establish a baseline for the update data received in the step 1920 of FIG. 19 from the server 1830. At step 1912G, client servers 1818, 1822, and 1826 send their respective subscription data to the server 1830. The initialization of the server 1830 begins with the receipt of the communication from the processor 1832 in step 1912B. At some time before the end of initialization step 1912, the server 1830, at a step 1912C, will retrieve the addresses of clients 1812, 1814, and 1816 from data structure 1834. Finally, at step 1912F, the processor 1832, the server 1830 and clients 1812, 1814, and 1816 are fully initialized and initialization step 1912 ends.

Figure 21:
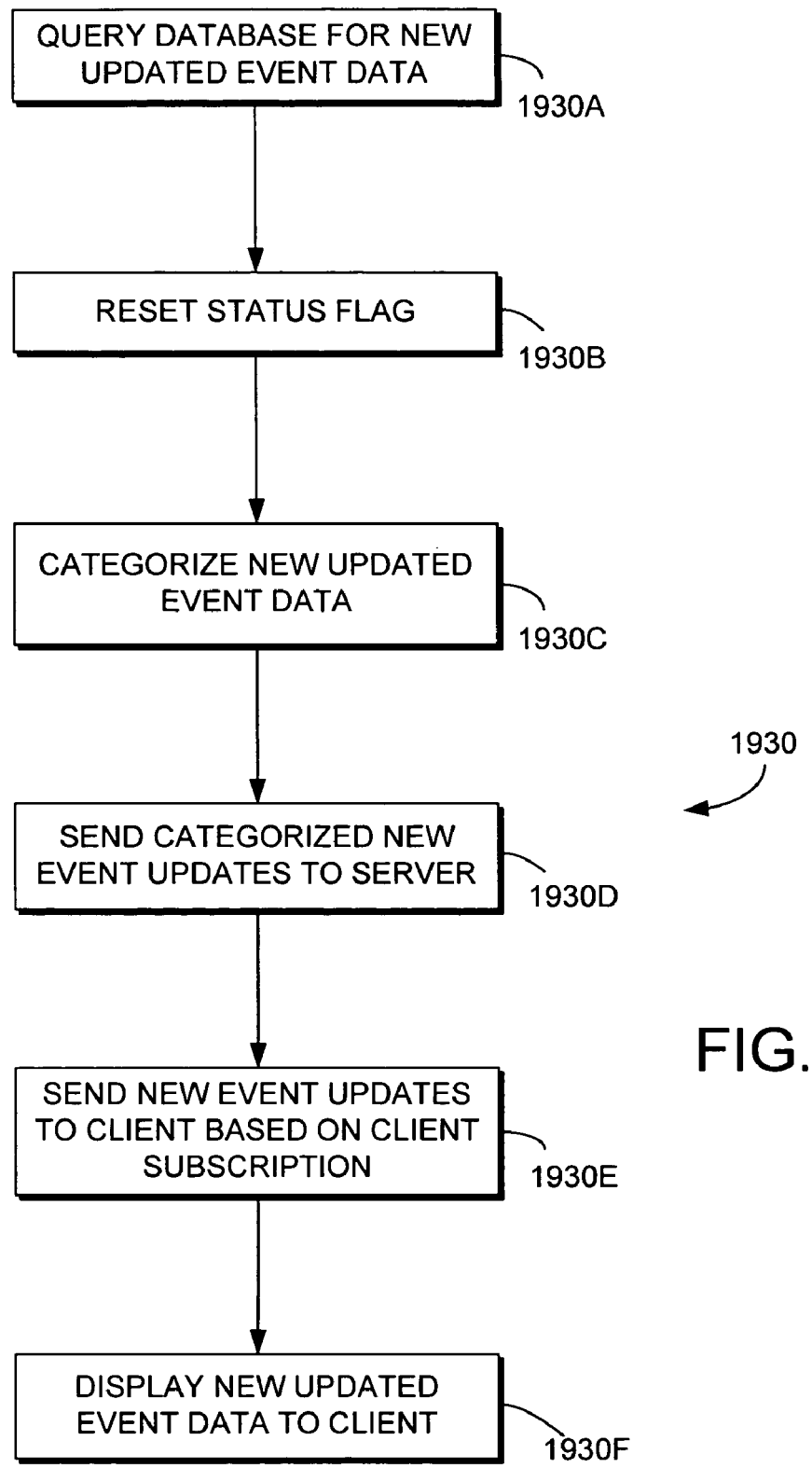
FIG. 21 is an embodiment of a more detailed flowchart of the step of acquiring new updated event data of FIG. 19.

Referring now to FIG. 21, there is illustrated a more detailed process flowchart of one embodiment of step 1930 of FIG. 19. In a step 1930A, after the predetermined time interval has lapsed, processor 1832 queries data structure 1834 for new update data with the appropriate status flag. After new update data is retrieved, at a step 1930B, the processor 1832 resets the status flag. Resetting the status flag indicates there are no available update data for an associated element type. At a step 1930C, the processor 1832 categorizes the new update data according to network element type. At a step 1930D, the processor 1832 sends the categorized new update data to the related channel on the server 1830. At a step 1930E, the server 30 sends the new update data to client data structures 1820, 1824, and 1828 based on the respective subscriptions of clients 1812, 1814, and 1816. Finally, at a step 1930F, client servers 1818, 1814, and 1816 display the new update data to their respective clients.

The system and processes illustrated in FIGS. 18-21 offer a client monitoring the status of network elements in a communications network several advantages. First, buy using push technology, the client is more efficient in monitoring a communications network because the client is not inundated with all event data originating from alarms in the communications network. The client only receives event data to which the client has subscribed. Second, new clients may be added without the addition of another server, making the system 1810 of FIG. 18 scalable at a low cost.

Moreover, many different arrangements of the various components depicted, as well as components not shown, are possible without departing from the spirit and scope of the present invention. Those skilled in the art will appreciate the litany of additional network components that can be used in connection with the present invention. The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention Certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

The invention claimed is:

1. One or more computer-readable media having computer-executable instructions embodied thereon for performing a method of associating network failures in a communications network to a common network resource, the method comprising:

populating a management data structure with relational data that describes a plurality of network components, wherein the plurality of network components includes the common network resource;

receiving an instance of fault data that indicates a problem with a network component;

associating fault data with the common network resource, thereby providing an association between the fault data and the common network resource;

storing said association in a network-fault data structure;

when multiple associations are present, grouping them into an event;

determining event categories that include,
(1) service-affecting events, which do not impact service to an end user of the communications network but have the potential to do so, and
(2) service-impacting events, which do impact service to the end user;

categorizing a first event as a service-affecting event when the common network resource is an optical facility and a percentage of child network components of the optical facility that are reporting service-affecting alarms is below a predetermined threshold;

categorizing a second event as a service-impacting event when the common network resource is an optical facility and the percentage of the optical facility's child network components that are reporting service-affecting alarms is above the predetermined threshold;

categorizing a third event as a service-impacting event when the common network resource is a Digital Signal 3 (DS3) facility; and storing a result of the categorizing in a memory component.

2. The media according to claim 1, wherein populating the management data structure with relational data further comprises:

communicating with a topology data structure, wherein the topology data structure comprises the plurality of network components of the communications network; and relating the plurality of network components to the common network resource based upon types of the plurality of network components.

3. The media according to claim 2, further comprising:
receiving by a probe coupled to each of the plurality of network components the fault data; and
associating the fault data with the common network resource based upon the relational data in the management data structure.

4. The media according to claim 3, further comprising the probe collecting in the network fault data structure the associated f fault data with the associated common network resource.

5. The media according to claim 4, wherein the event may be displayed on a presentation device.

6. Computer-readable media having computer-executable instructions embodied thereon that, when executed, cause a computing device to perform a method of correlating one or more network failures to a common network resource in a communications network, the method comprising:
associating each of a plurality of network components of the communications network one to another, wherein the plurality of network components include the common network resource;
attributing fault data originating from one or more of the plurality of network components to an associated common network resource;
collecting in at least one central data structure the attributed fault data with the associated common network resource;
grouping of the attributed fault data with the associated common network resource into an event;
determining categories of events that include,
(1) service-affecting events, which do not impact service to an end user of the communications network but have the potential to do so, and
(2) service-impacting events, which do impact service to the end user;
by way of the computing device, categorizing a first event as a service-affecting event when the associated common network resource is an optical facility and a percentage of child network components of the optical facility that are reporting service-affecting alarms is below a predetermined threshold;
by way of the computing device, categorizing a second event as a service-impacting event when the associated common network resource is an optical facility and the percentage of the optical facility's child network components that are reporting service-affecting alarms is above the predetermined threshold;
by way of the computing device, categorizing a third event as a service-impacting event when the associated common network resource is a Digital Signal 3 (DS3) facility; and
storing a result of the categorizing in at least one data structure.

7. The media according to claim 6, further comprising communicating with a topology data structure, wherein the topology data structure comprises the plurality of network components of the communications network.

8. The media according to claim 7, further comprising receiving by a probe coupled to each of the plurality of network components the fault data.

9. The media according to claim 8, further comprising the probe collecting in at least one central data structure the attributed fault data with the associated common network resource.

10. The media according to claim 9, wherein the event may be displayed on a presentation device.

11. Computer-readable media having computer-executable instructions embodied thereon that, when executed, cause a computing device to perform a method of incorporating into at least one central data structure one or more instances of fault data pertaining to one or more of a plurality of network components, the method comprising:
receiving fault data on one or more of the plurality of network components;
associating the fault data with an associated common network resource;
communicating to the at least one central data structure the associated fault data and the associated common network resource;
grouping the fault data with the associated common network resource into an event;
determining categories of events that include
(1) service-affecting events, which do not impact service to an end user of the communications network but have the potential to do so, and
(2) service-impacting events, which do impact service to the end user;
by way of the computing device, categorizing a first event as a service-affecting event when the associated common network resource is an optical facility and a percentage of child network components of the optical facility that are reporting service-affecting alarms is below a predetermined threshold;
by way of the computing device, categorizing a second event as a service-impacting event when the associated common network resource is an optical facility and the percentage of the optical facility's child network components that are reporting service-affecting alarms is above the predetermined threshold;
by way of the computing device, categorizing a third event as a service-impacting event when the associated common network resource is a Digital Signal 3 (DS3) facility; and
storing a result of the categorizing in at least one data structure.

12. The media according to claim 11, further comprising:
communicating with a topology data structure, wherein the topology data structure comprises the plurality of network components of a communications network; and
populating a management data structure with relational data on the plurality of network components, wherein the plurality of network components include the associated common network resource.

13. The media according to claim 12, further comprising:
receiving by a probe coupled to each of the plurality of network components the fault data; and
the probe associating the fault data with the associated common network resource based upon the relational data in the management data structure.

14. The media according to claim 13, further comprising the probe collecting in at least one central data structure the associated fault data with the associated common network resource.

15. The media according to claim 14, wherein the event may be displayed on a presentation device.

* * * * *